(12) United States Patent
Lynam et al.

(10) Patent No.: US 7,167,294 B2
(45) Date of Patent: *Jan. 23, 2007

(54) AUTOMOBILE EXTERIOR SIDEVIEW MIRROR SYSTEM

(75) Inventors: Niall R Lynam, Holland, MI (US); John O Lindahl, Fruitport, MI (US); Hahns Y Fuchs, Dorftrozelten (DE)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/817,645

(22) Filed: Apr. 2, 2004

(65) Prior Publication Data

US 2004/0190166 A1 Sep. 30, 2004

Related U.S. Application Data

(63) Continuation of application No. 09/745,172, filed on Dec. 20, 2000, now Pat. No. 6,717,712, which is a continuation-in-part of application No. 09/478,315, filed on Jan. 6, 2000, now Pat. No. 6,522,451.

(51) Int. Cl.
*G02F 1/15* (2006.01)
*G02B 5/10* (2006.01)
*G02B 7/182* (2006.01)
*B60R 1/06* (2006.01)

(52) U.S. Cl. .................. 359/265; 359/841; 359/864; 359/866; 359/868; 359/872; 248/549; 248/900

(58) Field of Classification Search ................ 359/841, 359/850, 851, 854, 864, 865, 866, 868, 872, 359/877, 265, 267; 248/549, 900
See application file for complete search history.

(56) References Cited

U.S. PATENT DOCUMENTS

| 2,890,539 | A | * | 6/1959 | Holt |
| 3,338,655 | A | | 8/1967 | Young |
| 3,375,053 | A | | 3/1968 | Ward ........................ 350/293 |
| 3,389,952 | A | | 6/1968 | Tobin, Jr. |
| 4,268,120 | A | | 5/1981 | Jitsumori ................... 350/302 |

(Continued)

FOREIGN PATENT DOCUMENTS

DE 2409748 9/1975

(Continued)

*Primary Examiner*—Ricky D. Shafer
(74) *Attorney, Agent, or Firm*—Van Dyke, Gardner, Linn & Burkhart, LLP

(57) ABSTRACT

An automobile exterior sideview mirror system includes an exterior sideview mirror assembly, which includes a reflective element assembly. The reflective element assembly includes a first reflective element having a unit magnification and a second reflective element having a curvature. The first reflective element and the second reflective element are supported at a support element. The mirror system preferably further includes an actuator, which is operable to adjust the orientation of the reflective element assembly. The second reflective element is disposed adjacent to and separate from the first reflective element when it is included in the exterior sideview mirror assembly. Further, a demarcation element is provided between the first reflective element and the second reflective element. A portion of the second reflective element adjacent the demarcation element has a front surface that is generally coplanar with the front surface of the first reflective element.

58 Claims, 13 Drawing Sheets

U.S. PATENT DOCUMENTS

| | | | |
|---|---|---|---|
| 4,306,770 A * | 12/1981 | Marhauer | 359/864 |
| 4,449,786 A | 5/1984 | McCord | 350/293 |
| 4,555,166 A * | 11/1985 | Enomoto | 359/874 |
| 4,678,294 A | 7/1987 | Van Nostrand | |
| 4,727,302 A * | 2/1988 | Mizuta et al. | 318/567 |
| 4,859,046 A * | 8/1989 | Traynor et al. | 359/866 |
| 4,917,485 A | 4/1990 | Baldwin, Sr. | |
| 5,005,962 A * | 4/1991 | Edelman | 359/864 |
| 5,239,405 A | 8/1993 | Varaprasad et al. | 359/272 |
| 5,412,512 A | 5/1995 | Zebold et al. | |
| 5,550,677 A | 8/1996 | Schofield et al. | 359/604 |
| 5,557,467 A | 9/1996 | McColgan et al. | |
| 5,621,577 A | 4/1997 | Lang et al. | |
| 5,668,663 A | 9/1997 | Varaprasad et al. | 359/608 |
| 5,724,187 A | 3/1998 | Varaprasad et al. | 359/608 |
| 5,751,489 A | 5/1998 | Caskey et al. | 359/603 |
| 5,784,211 A | 7/1998 | Mingledorff | |
| 5,793,542 A | 8/1998 | Kondo et al. | |
| 5,805,367 A | 9/1998 | Kanazawa | |
| 5,910,854 A | 6/1999 | Varaprasad et al. | 359/273 |
| 6,116,743 A | 9/2000 | Hoek | |
| 6,154,306 A | 11/2000 | Varaprasad et al. | 359/273 |
| 6,511,192 B1 | 1/2003 | Henion et al. | |
| 6,522,451 B1 | 2/2003 | Lynam | |
| 6,717,712 B1 * | 4/2004 | Lynam et al. | 359/265 |

FOREIGN PATENT DOCUMENTS

| | | |
|---|---|---|
| DE | 3620228 | 12/1987 |
| DE | 4026578 | 4/1992 |
| EP | 0310261 A1 | 9/1988 |
| EP | 0729864 | 9/1996 |
| EP | 0917987 | 5/1999 |
| FR | 2628042 | 9/1929 |
| GB | 2092543 | 8/1982 |
| JP | 1186443 | 7/1989 |

* cited by examiner

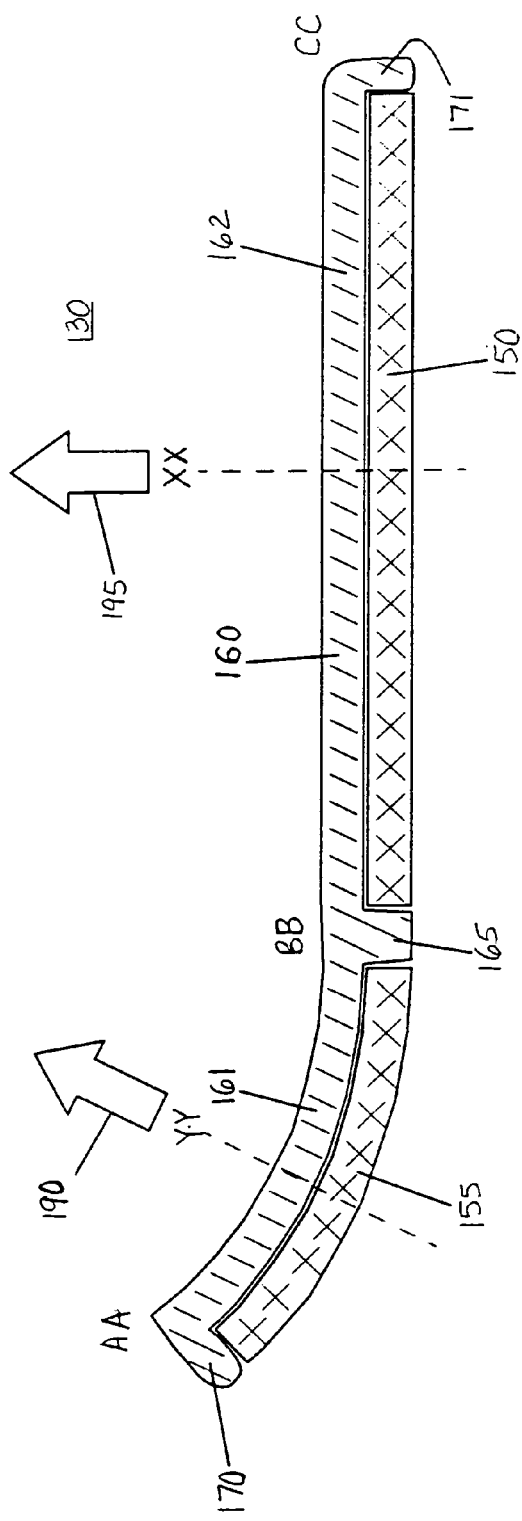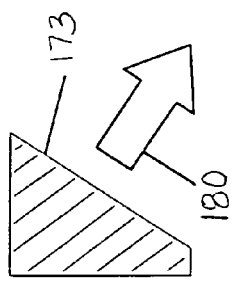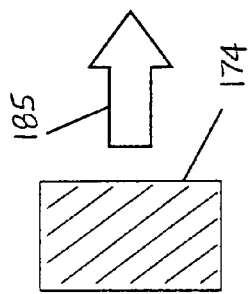
Figure 6
Figure 6A
Figure 6B

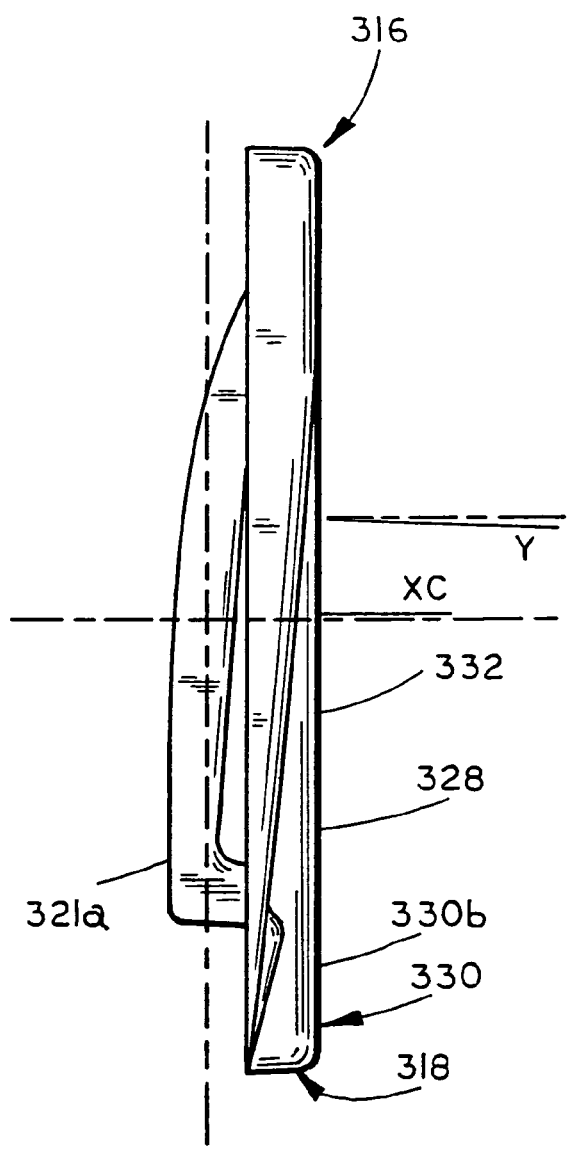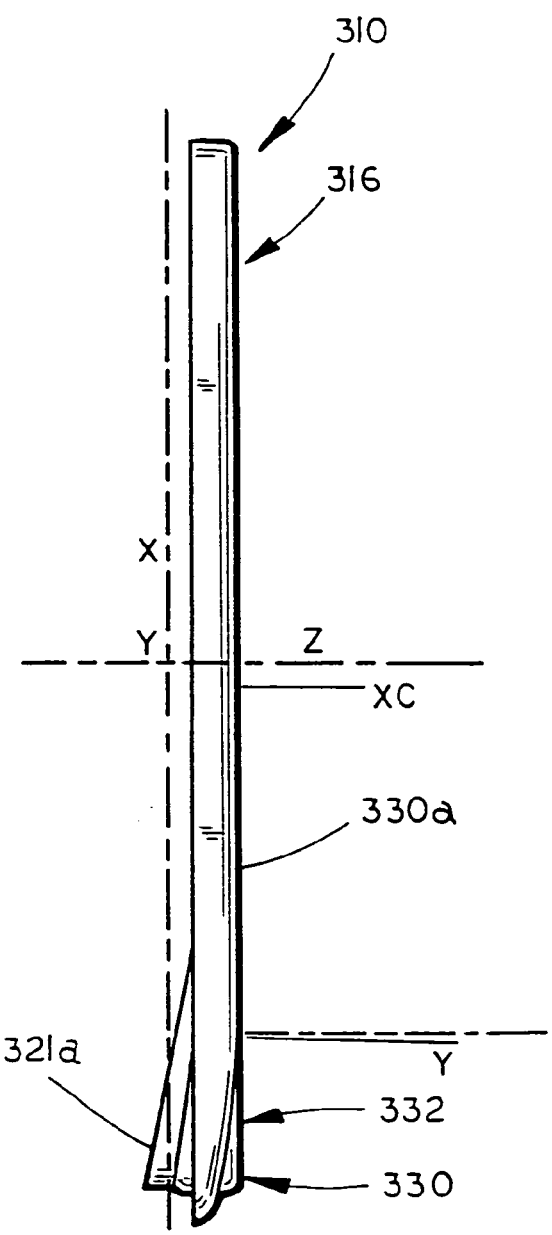

AUTOMOBILE EXTERIOR SIDEVIEW MIRROR SYSTEM

This is a continuation application of U.S. patent application Ser. No. 09/745,172, filed Dec. 20, 2000, entitled EXTERIOR MIRROR PLANO-AUXILIARY REFLECTIVE ELEMENT ASSEMBLY, now U.S. Pat. No. 6,717,712, which is a continuation-in-part of U.S. patent application Ser. No. 09/478,315, filed Jan. 6, 2000, entitled "EXTERIOR MIRROR PLANO-AUXILIARY REFLECTIVE ELEMENT ASSEMBLY", now U.S. Pat. No. 6,522,451, which are incorporated by reference herein in their entirety.

TECHNICAL FIELD AND BACKGROUND OF THE INVENTION

The present invention relates to exterior sideview mirror assemblies suitable for use on an automobile, and more specifically, to plano-auxiliary reflective element assemblies for use in automobile exterior sideview mirror assemblies.

Automobiles are typically equipped with an interior rearview mirror assembly (adapted for providing a rearward field of view immediately rearward of the vehicle, typically principally in the road lane the vehicle is traveling in) and at least one exterior sideview mirror assembly attached to the side of the vehicle (typically adjacent a front side window portion). The exterior side view mirror assembly typically comprises a reflective element adapted to provide a rearward field of view of the side lane adjacent the vehicle so as to allow the driver see whether a side approaching vehicle is present when the driver is contemplating a lane change. Conventionally, automobiles are equipped with a driver-side exterior mirror assembly and, very often, with a passenger-side exterior sideview mirror assembly mounted to the side of the automobile body opposite to that of the driver-side assembly. While the combination of an interior rearview mirror with a driver-side exterior mirror (and especially in a three-mirror system comprising an interior rearview mirror with a driver-side exterior mirror and a passenger-side exterior mirror) works well in many driving situations, rear vision blind spots present a potential safety hazard while driving. A rear vision blind spot is an area adjacent the side of an automobile where a view of another vehicle (overtaking on that side) is not captured in the rearward field of view of the exterior mirror reflector on that side. This presents a potential safety hazard as the driver, upon checking the view in the exterior sideview mirror and seeing no overtaking vehicle therein, may deem it safe to initiate a lane change, unaware that there is a vehicle immediately adjacent in a blind-spot of the exterior mirror reflector.

Various attempts have been made conventionally to minimize and/or eliminate exterior mirror blind-spots on vehicles. One approach is to make the exterior mirror reflector larger, and particularly wider with respect to the vehicle body. By increasing the width of the exterior mirror reflector, it has a wider field of view rearwards, and hence the reflector blind-spot is reduced. While use of a wide exterior mirror reflector is an option for trucks, buses and commercial vehicles, increasing the width of the reflector used in an exterior sideview mirror assembly mounted on automobiles (such as sedans, station wagons, sports cars, convertibles, minivans, sports utility vehicles, pick-up trucks and similar passenger carrying automobiles) is often not an option. In such domestic automobiles, increasing the width of the exterior mirror reflector increases the size of the exterior sideview mirror assembly with a concomitant increase in aerodynamic drag, increase in fuel consumption, increased difficulty in parking in tight parking spaces, and increased reflector vibration. Use of a non-flat, curved exterior mirror reflector is commonly used to increase rearward field of view without increasing reflector size.

While working well to increase field of view, use of a curved reflector (such as a convex, spherically-curved reflector) has disadvantages. The field of view rearward increases as the degree of curvature of the bent substrate increases (i.e., the field of view rearward increases as the radius of curvature of the bent substrate decreases). However, such wide-angle mirrors have non-unit magnification and distance perception rearward is distorted. For this reason, convex (spherically-bent) exterior mirror reflectors are required in some countries (such as the United States) to carry a safety warning "OBJECTS IN MIRROR ARE CLOSER THAN THEY APPEAR". Distance perception is particularly important for a driver-side exterior mirror. Indeed, Federal Vehicle Safety Standard No: 111 in the United States (the entire disclosure of which is hereby incorporated by reference herein) requires that the driver-side exterior mirror reflector exhibit unit magnification, and places restrictions on the radius of curvature allowed for any bent passenger-side mirror as well as requiring a safety warning be placed thereon. As an improvement over spherically bent/convex mirror reflectors, aspherical or multiradius mirror reflectors (such as are disclosed in U.S. Pat. Nos. 4,449,786 and 5,724,187, the entire disclosures of which are hereby incorporated by reference herein) have been developed. Such mirrors are widely used in Europe and Asia for both driver-side exterior mirror reflectors and for passenger-side exterior mirror reflectors. The aspherical or multiradius mirror reflectors typically have a less curved (larger radius of curvature) reflective region that is inboard or closest to the driver when mounted on a vehicle and, usually separated by a demarcation line or the like, have a more curved (smaller radius of curvature) region that is outboard or farthest from the driver when mounted on a vehicle. However, such aspherical or multiradius reflectors do not have unit magnification and so cannot be used when unit magnification is mandated (such as by FMVSS 111, referenced above).

To supplement a flat driver-side exterior mirror reflector, an auxiliary and separate bent reflector is sometimes incorporated into the driver-side exterior sideview mirror assembly. However, this is often not suitable for passenger automobiles because of the extra space required in the sideview mirror assembly to accommodate an auxiliary reflector element. Also, in most passenger automobiles, the position of the side view mirror reflector is adjustable by the driver (such as by a hand-adjust, or by a manually adjustable cable such as a Bowden cable or by an electrically operable actuator, as known in the art) in order to provide to that driver his or her desired rearward field of view, which ill-suits use of a separate, auxiliary reflector. Likewise, addition of stick-on blind-spot mirror reflectors (such as are commonly sold in automotive parts stores and the like) onto an automobile exterior sideview mirror reflector has disadvantages, including obscuring field of view of the automobile mirror reflector and adding to mirror element vibration.

There is thus a need to provide an automobile exterior sideview reflective element, and particularly a driver-side automobile exterior sideview reflective element, that overcomes the disadvantages above and that provides the driver of the automobile with a distortion-free field of view with unit magnification that is supplemented with a wide-angle view of a side lane blind spot, and there is a need that this be provided in a unitary reflective element assembly module suitable to mount onto, and be adjusted by, the mirror reflector adjustment mechanism (such as an electrically operated, motorized actuator) provided in the exterior sideview mirror assembly.

SUMMARY OF THE INVENTION

According to the present invention, an automobile exterior sideview mirror system includes an exterior sideview mirror assembly having a reflective element assembly. The reflective element assembly includes a first reflective element and a second reflective element, which together provide an increased field of view for the exterior side mirror assembly.

In one form of the invention, an automobile exterior side mirror system includes an exterior side mirror assembly, which is adapted for attachment to a side of an automobile. The exterior sideview mirror assembly includes a reflective element assembly having a plano reflective element, which forms a first reflective element, and a multiradiused reflective element which forms a second reflective element. The reflective element assembly is mounted to an actuator, which moves the reflective element assembly to position the rearward field of view of the reflective element assembly. The reflective element assembly further includes a frame element assembly to which the first and second reflective elements are mounted and which orients the second reflective element such that it has a viewing range which spans outwardly and downwardly with respect to the first reflective element to thereby provide an increased field of view for the exterior sideview mirror assembly.

In one aspect, the first reflective element and the second reflective element are adjacently attached to the frame element assembly at a joint. The reflective element assembly further includes a demarcation element disposed at its joint to form a demarcation between the first and second reflective elements that is visible to the driver. In a further aspect, the frame element assembly includes a bezel portion which extends around the first reflective element, with the demarcation element comprising a segment of the first bezel portion.

In another aspect, the second reflective element comprises a bent glass substrate with radii of curvature in the range of about 4000 mm to about 100 mm.

In yet another aspect, the frame element assembly includes a frame, with the first and second reflective elements being mounted in the frame. The multiradiused reflective element is mounted to the frame at an outboard position, with the plano reflective element being positioned adjacent the multiradiused reflective element and at an inboard position with respect to the multiradiused reflective element when the exterior side mirror assembly is mounted to an automobile. In a further aspect, the plano reflective element is mounted to the frame by a backing plate, which is preferably adapted to mount to the actuator.

In other aspects, the first reflective element includes a rearward field of view having a principal axis, which is different from and angled to a principal axis of the rearward field of view of the second reflective element when the reflective element assembly is mounted in the exterior sideview mirror assembly. The principal axis of the rearward field of view of the second reflective element is directed generally outwardly and downwardly with respect to a longitudinal axis of the automobile when the exterior side mirror system is mounted to an automobile. For example, the principal axis of the rearward field of view of the second reflective element may form a downward angle with respect to the principal axis of the rearward field of view of the first reflective element in the range from about 0.75° to about 5°, or in a range of about 1.5° to about 3.5°, in a range of about 2° to about 3°.

In other aspects, the principal axis of the second reflective element forms an outward angle with respect to the principal axis of the rearward field of view of the first reflective element in a range of about 0.75° to about 5°, or in a range of about 1° to about 3°, or in a range of about 1.25° to about 2.5°.

According to another form of the invention, an automobile exterior side mirror system includes an exterior side mirror assembly, which is adapted for attachment to a side of an automobile. The exterior side mirror assembly includes a mirror casing, a reflective element assembly, and an actuator. The reflective element assembly includes a frame element assembly, a first reflective element having a unit magnification, and a second reflective element having a multiradiused curvature. The frame element assembly mounts the first reflective element and the second reflective element in the mirror casing and is adapted to mount to the actuator, which adjusts the orientation of the reflective element assembly. The first reflective element has a first rearward field of view with a first principal axis, and the second reflective element has a second rearward field of view with a second principal axis, with the second principal axis being angled outwardly and downwardly with respect to the first principal axis.

In one aspect, the second principal axis is angled outwardly from the first principal axis at an angle in a range of about 0.75° to about 5°, or in a range of approximately 1° to about 3°, or at an angle in a range of about 1.25° to about 2.5°.

In another aspect, the second principal axis is angled downwardly from the first principal axis at an angle in a range of approximately 0.75° to about 5°, or in a range of about 1.5° to about 3.5°, or at an angle in a range of about 2° to about 3°.

In another aspect, the frame includes a support surface for the second reflective element, with the support surface angling the second principal axis of the second reflective element.

In yet another form of the invention, an automobile exterior sideview mirror system includes an exterior sideview mirror assembly, which is adapted for attachment to a side of an automobile. The mirror assembly includes an actuator and a reflective element assembly. The reflective element assembly includes a frame element assembly, a first reflective element, and a second reflective element. The frame element assembly is adapted to mount to the actuator and includes a frame and a support surface for the second reflective element. The actuator adjusts the position of the reflective element assembly to thereby adjust the viewing angle of the sideview mirror system. The support surface angles the second reflective element downwardly and forwardly of the first reflective element when the mirror assembly is mounted to an automobile whereby the second reflective element provides a viewing range which spans outwardly and downwardly with respect to the automobile to thereby provide an increased field of view for the exterior sideview mirror assembly.

In one aspect, the support surface is provided by a plate element, for example a solid plate element or a foraminous plate element. In other aspects, the support surface is provided by a frame.

In further aspects, the frame includes a first bezel portion and a second bezel portion, with the first bezel portion extending around the first reflective element, and the second bezel portion extending around the second reflective element. In one form, the second bezel portion is angled forwardly with respect to the first bezel portion when said exterior sideview mirror assembly is mounted to a side of an automobile.

In another aspect, the second reflective element is located outboard of the first reflective element.

These and other advantages, features, and modifications will become more apparent when reviewed in conjunction with the drawings and the detailed description which follows.

BRIEF DESCRIPTION OF THE DRAWINGS

FIG. 6 is a sectional view of a second embodiment of a plano reflective element assembly according to the present invention including a demarcation element formed as a dividing wall in a backing plate element;

FIG. 6A is a cross-section taken along line XX of FIG. 6;

FIG. 6B is a cross-sectional view taken along line YY of FIG. 6;

FIG. 10 is an end view of the plano reflective element assembly of FIG. 8 as viewed from line X—X of FIG. 8;

FIG. 11 is a top view of the plano reflective element assembly of FIG. 8 as viewed from line XI—XI of FIG. 8;

DETAILED DESCRIPTION OF THE PREFERRED EMBODIMENTS

Figure 1:
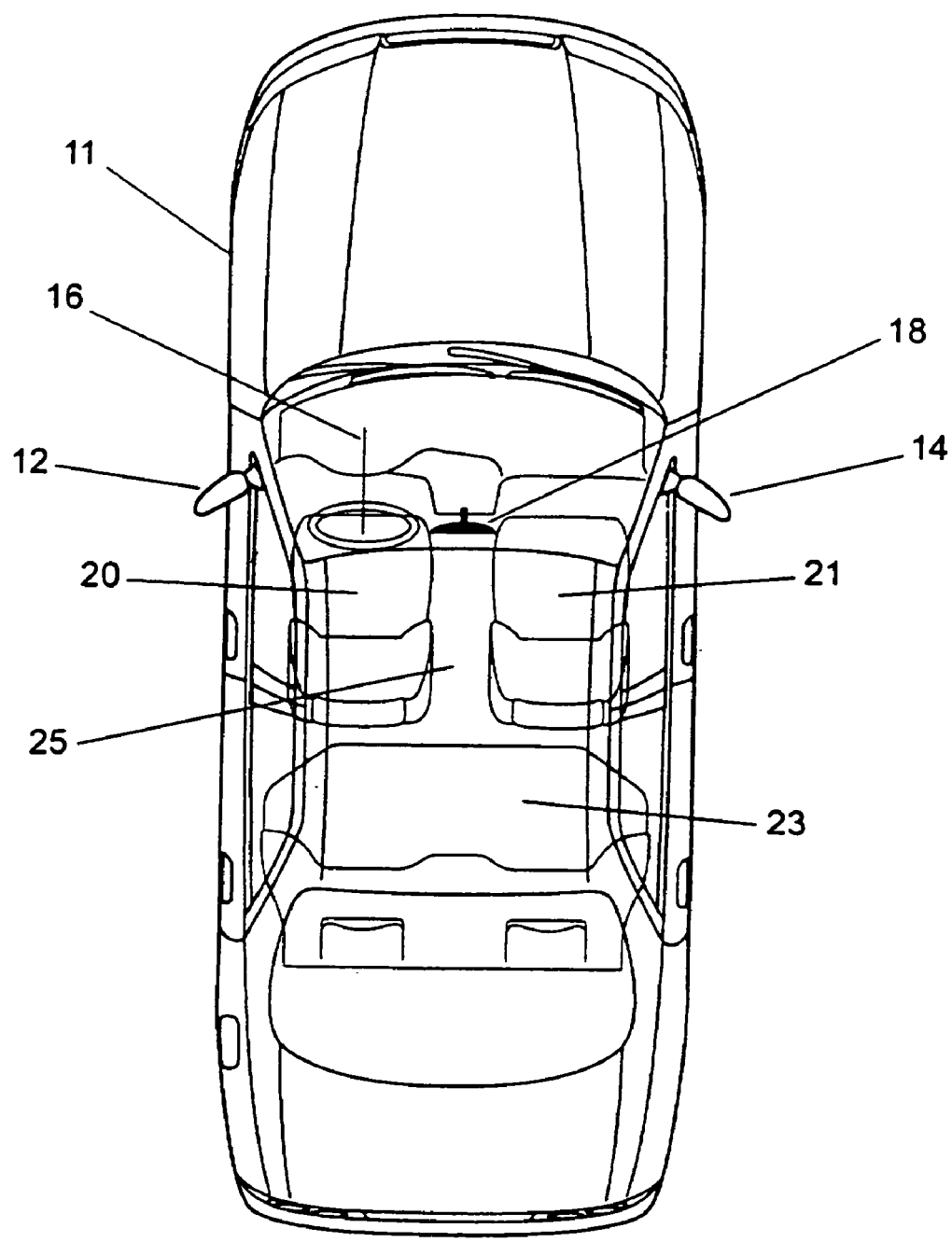
FIG. 1 is a perspective view of an automobile equipped with exterior sideview mirror assemblies according to this present invention.
Figure 2:
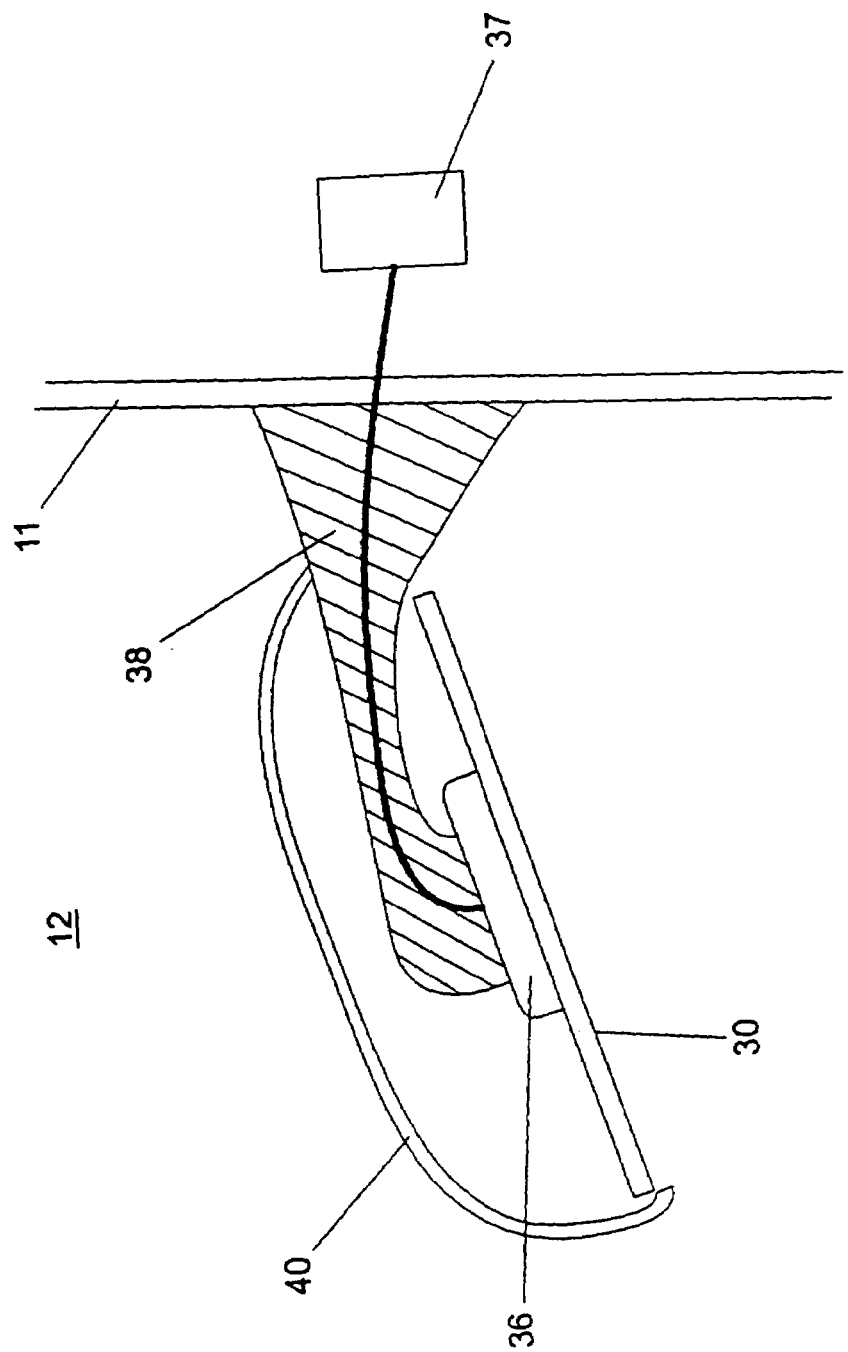
FIG. 2 is a top plan partial fragmentary view of the driver's side exterior rearview mirror assembly of FIG. 1.

As illustrated in FIG. 1, passenger automobile 10 (which may be a sedan, a station-wagon, a sports car, a convertible, a minivan, a sports utility vehicle, a pick-up truck or a similar passenger carrying non-commercial, personal transportation automobile) includes an interior rearview mirror assembly 18 positioned within interior vehicle cabin 25. Interior vehicle cabin 25 further includes a steering wheel 16, a driver seat 20 positioned at steering wheel 16, a front passenger seat 21 adjacent to driver seat 20 in the front portion of cabin 25, and a rear passenger seat 23 in the rear portion of cabin 25. Automobile 10 further includes a driver-side exterior sideview mirror assembly 12 and a passenger-side exterior sideview mirror assembly 14, each adapted for attachment to opposing sides of automobile body 11, most preferably adjacent to the seating position of the driver seated in driver seat 20 for driver-side assembly 12 and adjacent to the front passenger seat 21 for passenger-side assembly 14. Exterior sideview mirrors, mounted as shown in FIG. 1 close to the driver seating location, are commonly referred to as door-mounted exterior sideview mirror assemblies. Driver-side exterior sideview mirror assembly 12 includes, as illustrated in FIG. 2, a plano-multiradius exterior sideview reflective element assembly 30. Plano-multiradius reflective element assembly 30 is mounted to a reflective element positioning actuator 36. The orientation of plano-multiradius reflective element assembly 30, and hence its rearward field of view, is adjustable by actuator 36 in response to control 37. Control 37 can comprise a handset control that allows the driver manually move the orientation of plano-multiradius reflective element assembly 30 within exterior mirror housing 40 (such as by a lever control or by a cable control) and hence reposition the rearward field of view of plano-multiradius reflective element assembly 30. Alternately, when actuator 36 comprises an electrically actuated actuator that is electrically operable incorporating at least one motor, control 37 can comprise a switch (which, preferably, is operable under control of the driver seated in cabin 25) or control 37 can comprise a memory controller, as known in the automotive mirror art, that controls actuator 36 to move the position of plano-multiradius reflective element assembly 30 to a preset orientation that suits the rearward field of view preference of an individual driver. Actuator 36 is mounted to bracket 38 which attaches to vehicle body side 11. Plano-multiradius reflective element assembly 30 is positionable by actuator 36 within exterior mirror housing 40.

Figure 3:
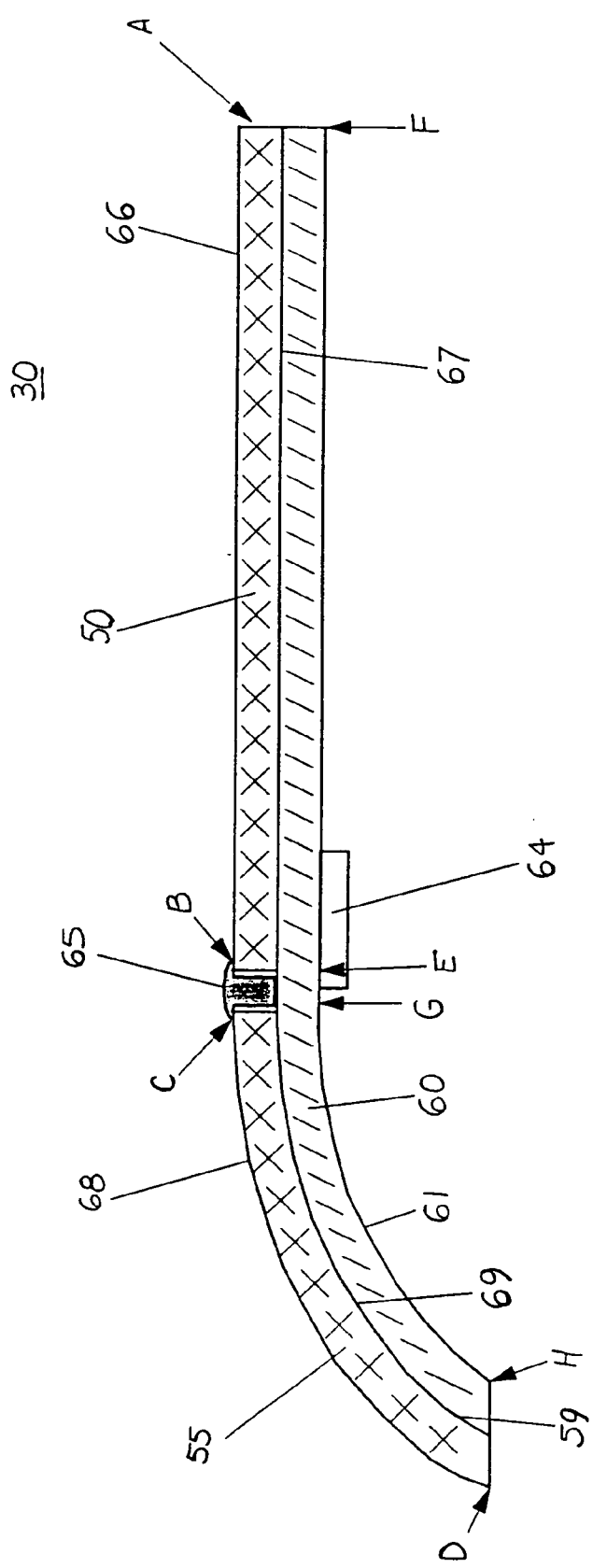
FIG. 3 is an enlarged sectional view of a plano-multiradius reflective element assembly of the mirror assembly in FIG. 2.

Plano-multiradius reflective element assembly 30, as shown in FIG. 3, comprises a plano element 50 and a separate multiradius element 55. Preferably, plano element 50 is adjacent to multiradius element at a joint. At their joint, plano element 50 and separate multiradius element 55 can touch leaving substantially no gap or space therebetween, or plano element 50 and separate multiradius element 55 can be spaced apart at their joint by a space or gap, as in FIG. 3. Plano element 50 and multiradius element 55 are both mounted to surface 59 of, and are both supported by, a single backing plate element 60. Plano element 50 and multiradius element 55 are demarcated apart by demarcation element 65. Surface 61 of backing plate element 60 is preferably adapted to attach, such as by attachment member 64, to actuator 36 when plano-multiradius reflective element assembly 30 is mounted in driver-side exterior sideview mirror assembly 12 (and/or in passenger-side exterior side view mirror assembly 14) such that plano element 50 and multiradius element 55 are adjusted and positioned in tandem and simultaneously when the driver (or alternatively, when a mirror memory system, as is conventional in the rearview mirror arts) activates actuator 36 to reposition the rearward field of view of plano-multiradius reflective element assembly 30. Thus, since elements 50, 55 are part of plano-multiradius reflective element assembly 30, movement of plano-multiradius reflective element assembly 30 by actuator 36 simultaneously and similarly moves plano element 50 and multiradius element 55.

Plano element 50 preferably comprises a flat reflector-coated glass substrate having unit magnification, and comprises a reflective surface through which the angular height and width of the image of an object is equal to the angular height and width of the object when viewed at the same distance (except for flaws that do not exceed normal manufacturing tolerances). Plano element 50 may comprise a conventional fixed reflectance mirror reflector or it may comprise a variable reflectance mirror reflector whose reflectivity is electrically adjustable. For example, plano element 50 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of plano element 50 may be a first surface coating (such as on surface 66) or a second surface coating (such as on surface 67), as such terms are known in the mirror art. The reflector coating on plano element 50 may also comprise a dielectric coating, or a multilayer of dielectric coatings, or a combination of a metal layer and a dielectric layer to form automotive mirror reflectors as known in the automotive mirror art. If a variable reflectance reflector element, plano element 50 preferably comprises an electro-optic reflector element and, most preferably, an electrochromic reflector element.

When mounted into exterior side view mirror assembly 12 and/or 14, plano-multiradius reflective element assembly 30 is preferably orientated so that at least a portion of (more preferably a substantial portion of) the reflector surface of plano element 50 is positioned closer to the vehicle body (and hence to the driver) than any portion of the reflector surface of multiradius element 55. Thus, and referring to FIG. 3, side A of plano element 50 of plano-multiradius reflective element assembly 30 is positioned closer to the driver than side D of multiradius element 55 when plano-multiradius reflective element assembly 30 is mounted on an automobile. Also, when mounted into exterior side view mirror assembly 12 and/or 14, surfaces 66, 68 of plano-multiradius reflective element assembly 30 face rearwardly in terms of the direction of vehicle travel.

Multiradius element 55 of plano-multiradius reflective element assembly 30 preferably comprises a curved/bent mirrored glass substrate. The degree of curvature preferably increases (and hence the local radius of curvature decreases) across the surface of multiradius element 55 with the least curvature (largest radius of curvature) occurring at the side of multiradius element 55 (side C in FIG. 3) positioned adjacent its joint to plano element 50 when both are mounted on backing plate element 60. Thus, and referring to FIG. 3, the local radius of curvature at side C of multiradius element 55, when mounted on backing plate element 60, is larger than at side D. Also, the local radius of curvature preferably progressively decreases across multiradius element 55 from side C to side D. Preferably, the local radius of curvature at side C of multiradius element 55 is at least about 1000 mm; more preferably is at least about 2000 mm and most preferably is at least about 3000 mm whereas the local radius of curvature at side D of multiradius element 55 is, preferably, less than about 750 mm, more preferably less than about 350 mm; most preferably less than about 150 mm. Preferably, multiradius element 55 comprises a bent glass substrate with radii of curvature in the range of from about 4000 mm to about 50 mm. The multiradius prescription for the multiradius element to be used in a particular exterior mirror assembly can vary according to the specific field of view needs on a specific automobile model.

The total field of view rearwardly of the automobile of the plano-auxiliary reflective element assembly (which is a combination of the field of view of the plano reflective element and of the auxiliary reflective element) preferably generally subtends an angle of at least about 20° (and more preferably, generally subtends an angle of at least about 25° and most preferably, generally subtends an angle of at least about 30°) with respect to the side of an automobile to which is attached an exterior sideview mirror assembly equipped with the plano-auxiliary reflective element assembly.

Multiradius element 55 may comprise a conventional fixed reflectance mirror reflector or it may comprise a variable reflectance mirror reflector whose reflectivity is electrically adjustable. For example, multiradius element 55 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of multiradius element 55 may be a first surface coating (such as on surface 68) or a second surface coating (such as on surface 69), as such terms are known in the mirror art. The reflector coating on multiradius element 55 may also comprise a dielectric coating, or a multilayer of dielectric coatings, or a combination of a metal layer and a dielectric layer to form automotive mirror reflectors as known in the automotive mirror art. If a variable reflectance reflector element, multiradius element 55 preferably comprises an electro-optic reflector element and, most preferably, an electrochromic reflector element.

Also, it is preferable that the thickness of piano element 50 and multiradius element 55 be substantially the same in dimension so that their respective outer surfaces, 66 and 68, are substantially coplanar so that a driver can readily view images in either or both elements. The thickness dimension of elements 50, 55 is determined by the thickness of the substrate (or in the case of laminate-type electrochromic reflective elements, the thickness of the two substrates between which the electrochromic medium is disposed). For example, plano element 50 and/or multiradius element 55 can comprise a reflector coated glass substrate or panel of thickness preferably equal to or less than about 2.3 mm, more preferably equal to or less than about 1.6 mm, most preferably equal to or less than about 1.1 mm. Use of a thinner substrate is beneficial in terms of improving the overall stability/vibration performance of the image seen in plano-multiradius reflective element assembly 30 when mounted to an automobile.

The reflector area of plano element 50 is preferably larger than that of multiradius element 55. Preferably, the width dimension of plano element 50 is larger than the width dimension of multiradius element 55 (both width dimensions measured at their respective widest dimension and with the width of the respective element being gauged with the respective element oriented as it would be orientated when mounted on the automobile). Thus, and referring to FIG. 3, the distance from side A to side B of plano element 50 is larger than the distance from side C to side D of multiradius element 55. Thus, the ratio of the width of plano element 50 to the width of multiradius element 55 is preferably greater than 1; more preferably greater than 1.5; most preferably greater than 2.5 in order to provide a large, unit magnification plano element 50 as the principal rear viewing portion of plano-multiradius reflective element assembly 30 and providing multiradius element 55 as a smaller, auxiliary, separate, wide-angle viewing portion of plano-multiradius reflective element assembly 30. For plano-multiradius reflective element assemblies to be mounted to the exterior sideview assemblies of passenger automobiles used non-commercially and for non-towing purpose, the width of plano element 50 (at its widest dimension) is preferably in the range of from about 50 mm to about 225 mm; more preferably in the range of from about 75 mm to about 175 mm; most preferably in the range of from about 100 mm to about 150 mm.

Backing plate element 60 is preferably a rigid polymeric substrate capable of supporting plano element 50 and multiradius element 55. Backing plate element 60 comprises a flat portion (generally between E and F as shown in FIG. 3) that corresponds to and is aligned with plano element 50. Backing plate element 60 also comprises a curved portion (generally between G and H as shown in FIG. 3) that corresponds to and is aligned with multiradius element 55. Preferably, curved portion G-H of multiradius element 55 is fabricated with a multiradius prescription that is substantially the same as the multiradius prescription of multiradius element 55. Backing plate element 60 is formed as a single element to which elements 50 and 55 are separately attached. Preferably, backing plate element 60 is formed by injection molding of a thermoplastic or a thermosetting polymer resin. Materials suitable to use for backing plate element 60 include unfilled or filled polymeric materials such as glass and/or mineral filled nylon or glass and/or mineral filled polypropylene, ABS, polyurethane and similar polymeric materials. For example, backing plate element 60 can be formed of ABS in an injection molding operation. Plano element 50 can be cut from a stock lite of flat chromium mirror-coated 1.6 mm thick glass. Multiradius element 55 can be cut from a stock lite of multiradiusly-bent chromium mirror-coated 1.6 mm thick glass. Plano element 50 and multiradius element 55 can then be attached (such as by an adhesive attachment such as an adhesive pad or by mechanical attachment such by clips, fasteners or the like) to the already molded backing plate element 60. Alternatively, plano element 50 and multiradius element 55 can each by individually loaded into an injection molding tool. Once loaded, a polymeric resin (or the monomers to form a polymeric resin) can be injected into the mold in order to integrally form backing plate element 60 with elements 50, 55 integrally molded thereto. Integral molding of the backing plate element to plano element 50 and multiradius element 55 (along with any other elements such as the demarcation element 65) in a single integral molding operation, is a preferred fabrication process for plano-multiradius reflective element assembly 30.

Figure 4:
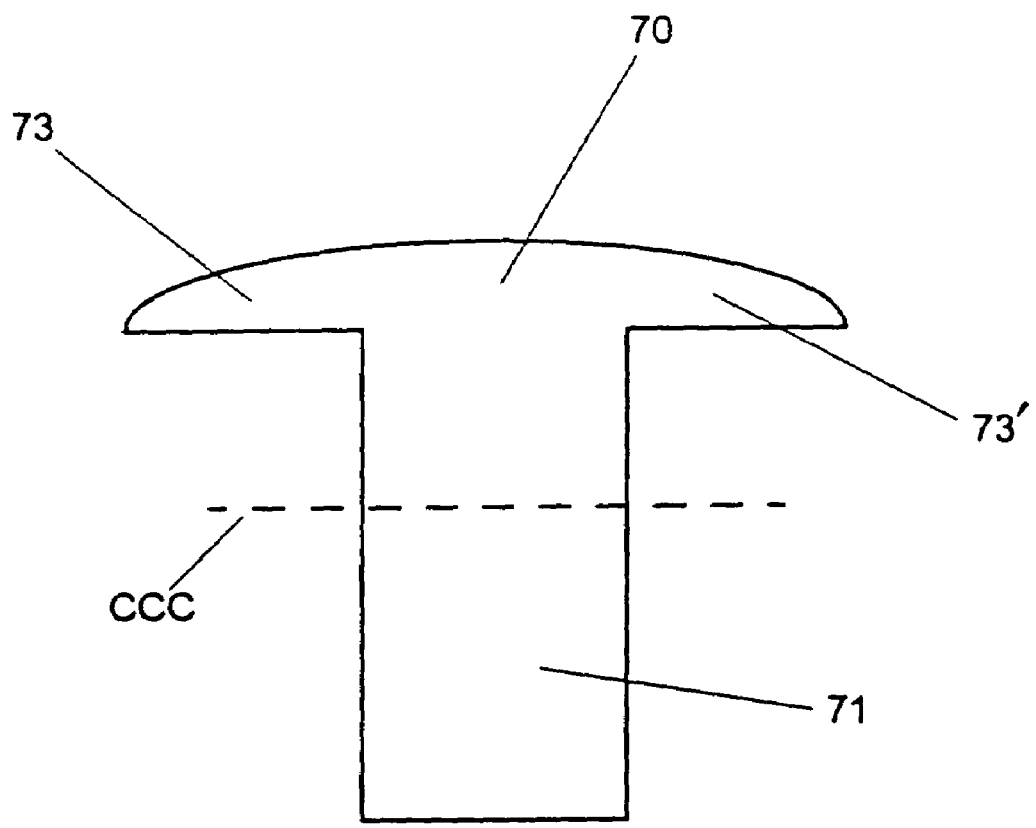
FIG. 4 is an enlarged sectional view of a demarcation element of the plano-multiradius reflective element assembly of FIG. 3.

Plano-multiradius reflective element assembly 30 further preferably includes demarcation element 65 that functions to delineate and demarcate the plano region of the assembly from the wide-angle, multiradius region and also preferably functions to prevent ingress of debris, dirt, water and similar contaminants (such as road splash, car wash spray, rain, snow, ice, leaves, bugs and similar items that plano-multiradius reflective element assembly 30 would be subject to when mounted and used on an automobile) into any gap between piano element 50 and multiradius element 55 when both are attached to backing plate element 60. Optionally, at least a portion of demarcation element 65 can be disposed in any gap between plano element 50 and multiradius element 55 at their joint on backing plate element 60. Preferably, demarcation element 65 is formed of a polymeric material that is dark colored (such as black or dark blue or dark brown or dark grey or a similar dark color) such as a dark colored polypropylene resin or a dark colored nylon resin or a dark colored polyurethane resin or a dark colored polyvinyl chloride resin or a dark colored silicone material. Most preferably demarcation element 65 is formed of an at least partially elastomeric material (such as silicone, or EPDM, or plasticized PVC or the like) in order to provide a degree of vibration dampening for elements 50, 55. As shown in FIG. 4, demarcation element 65 optionally includes a crown portion 70 that includes wing portions 73, 73' and a stem portion 71. Stem portion 71 preferably has a cross-sectional width CCC of less than about 4 mm, more preferably less than about 3 mm and, most preferably less than about 2 mm. Crown portion 70 preferably is dimensioned to not protrude substantially beyond surfaces 66, 68 of elements 50, 55 when demarcation element 65 is installed between elements 50 and 55. Also, wings 73, 73' are preferably dimensioned to protrude (most preferably slightly) onto surfaces 66, 68 of elements 50, 55 when demarcation element 65 is installed between elements 50 and 55 in order to provide a weather barrier seal and/or to at least partially accommodate any dimensional tolerances of elements 50, 55 that could lead to variation in the inter-element gap between sides C and B. While the demarcation element shown in FIG. 4 is one embodiment, other constructions are possible including a demarcation element that has minimal or no crown portion. Likewise, a demarcation element can have little or no stem portion, especially when the joint between plano element 50 and multiradius element 55 includes no gap to receive a stem. Also, where a gap at the plano to multiradius joint exists, any stem of the demarcation element can at least partially be disposed in such gap so as to at least partially fill the gap (or it can optionally substantially fill the gap). Optionally, demarcation element 65 is fabricated by injection molding of a polymeric resin. After plano element 50 and multiradius element 55 have been attached to backing plate element 60, a separately formed demarcation element 65 can then be inserted (and secured such as by an adhesive or by a mechanical attachment such as by a fastener) into a space between elements 50 and 55. Note that, optionally, side B of plano element 50 and side C of multiradius element 55 can touch (leaving substantially no gap or space therebetween). In such a situation, demarcation element 65 can comprise a dark colored strip such as of a tape or of a plastic film that covers the joint between elements 50 and 55. Alternatively, demarcation element 65 can comprise a preferably dark-colored paint, lacquer, caulk or similar material that can be applied to, and that can preferably fill into, the joint between elements 50 and 55. The width of the portion of demarcation element 65 that is visible to the driver is preferably less than about 4 mm, more preferably less than about 3 mm and most preferably less than about 2 mm, but is equal to or greater than about 0.5 mm, more preferably is equal to or greater than about 0.75 mm, most preferably is equal to or greater than about 1 mm in order to provide adequate demarcation of the piano region from the multiradius radius region without unduly obscuring the rearward field of view of the respective elements. Optionally, demarcation element 65 can be formed as part of backing plate element 60 such as by forming demarcation element 65 as a wall structure of the backing plate element that partitions backing plate element 60 into two regions: A first region adapted to receive plano reflective element 50 and a separate and adjacent second region adapted to receive multiradius reflective element 55.

Thus, and referring to FIG. 6, a second embodiment of plano-multiradius reflective element assembly 130 may include a backing plate element 160 which comprises a plate molded from a polymer resin (such as a polyolefin such as polypropylene or such as ABS or nylon) with a demarcation element 165 that is molded as a wall structure that partitions backing plate element 165 into a first region (from CC to BB) adapted to receive and accommodate plano reflective element 150 and into a second region (from BB to AA) adapted to receive and accommodate wide-angle optic multiradius reflective element 155. Note that section AA to BB of backing plate element 160 is angled to section BB to CC. Such angling of the auxiliary reflective element relative to the plano element can be advantageous in allowing the auxiliary reflective element view a portion of the road adjacent the automobile that is in a blind spot of the plano reflective element. In this regard, it is preferable that the multiradius element be angled away from the plane of the plano element, as shown in FIG. 6 by the angling of section AA to BB to section BB to CC.

Preferably, demarcation element 65 is formed in an integral molding operation, along with formation of backing plate element 60, and attachment of elements 50, 55 thereto. For example, piano element 50 and multiradius element 55 can each by individually loaded into an injection molding tool. Once loaded, a polymeric resin (or the monomers to form a polymeric resin) can be injected into the mold in order to integrally form backing plate element 60 with elements 50, 55 integrally molded thereto and, in the same molding operation and in the same tool, also form by molding the demarcation element. Integral molding of the backing plate element to plano element 50 and multiradius element 55 along with creation in the single molding operation of demarcation element 65 (along with any other elements such as attachment member 64) in a single integral molding operation, is a preferred fabrication process for plano-multiradius reflective element assembly 30. By loading all the sub components of plano-multiradius reflective element assembly 30 into a molding tool, and then injecting polymeric resin to form the backing plate, demarcation member and any attachment member, a substantially complete or fully complete plano-multiradius reflective element assembly can be unloaded from the tool at the completion of the integral molding operation (as known in the molding art), thus enabling economy in manufacturing and accommodation of any dimensional tolerances in the sub components. Where integral molding is so used, it is preferable to use a reactive molding operation such as reactive injection molding of a urethane as such reactive injection molding operations occur at relatively modest temperatures.

Plano element 50 and/or multiradius element 55 can comprise a heater element, as known in the automotive mirror art, that is operable to deice/demist surfaces 66, 68. Such heater elements are conventional and can comprise a positive temperature coefficient heater pad, a resistive heater element and/or a conductive coating. Plano element 50 and/or multiradius element 55 can also optionally comprise a scatterproofing member, as known in the automotive mirror art, such as an adhesive tape, to enhance safety in an accident.

Also, plano element 50 and/or multiradius element 55 can comprise a variable reflectance electro-optic element such as an electrochromic mirror reflector. Thus, both element 50 and element 55 can comprise an electrochromic mirror element or either of element 50 and element 55 can comprise an electrochromic mirror element and the other can comprise a fixed reflectance non-variable reflectance mirror element such as a metal reflector coated glass panel such as a chromium coated glass substrate. Also, if both plano element 50 and multiradius element 55 comprise an electro-optic element such as an electrochromic mirror element capable of electrically dimmable reflectivity, both elements 50, 55 can dim together and in tandem under control of a common dimming control signal (typically provided by an electro-optic automatic dimming interior mirror assembly mounted in the cabin of the automobile and equipped with photosensors to detect incident glare and ambient light). Alternately, if both plano element 50 and multiradius element 55 comprise an electro-optic element such as an electrochromic mirror element capable of electrically dimmable reflectivity, element 50 can dim independently of element 55 (such as is disclosed in U.S. Pat. No. 5,550,677, the entire disclosure of which is hereby incorporated by reference herein). If either or both of elements 50, 55 comprise an electrochromic element, preferably, the electrochromic reflective element comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., now U.S. Pat. No. 6,154,306, or such as is disclosed in U.S. Pat. Nos. 5,668,663; 5,724,187; 5,910,854; and 5,239,405, the entire disclosures of which are hereby incorporated by reference herein. Most preferably, in such laminate-type electrochromic mirror reflective elements, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the front-most surface of the rear substrate (the third surface as known in the mirror art) is reflector coated with a high reflecting metal film such as of aluminum or silver, or an alloy of aluminum or silver.

Backing plate element 65 of plano-multiradius reflective element assembly 30 is optionally equipped on its rearmost surface with attachment member 64 to facilitate attachment to the reflector-positioning actuator of the exterior sideview mirror assembly that plano-multiradius reflective element assembly 30 is mounted to. Attachment of plano-multiradius reflective element assembly 30 to the actuator can be by mechanical attachment such as by a tab, clip or fastener, or may be by adhesive attachment such as by a silicone adhesive, a urethane adhesive or a similar adhesive material such as a tape coated on both surfaces with a pressure sensitive adhesive to form a "double-sticky" tape. The exterior sideview mirror assembly, on whose mirror reflector-positioning actuator the plano-multiradius reflective element assembly is mounted, can be a fixedly attached exterior sideview mirror assembly, a break-away exterior sideview mirror assembly and a powerfold exterior sideview mirror assembly, as known in the automotive mirror art.

Figures 5A, 5B, 5C, 5D:
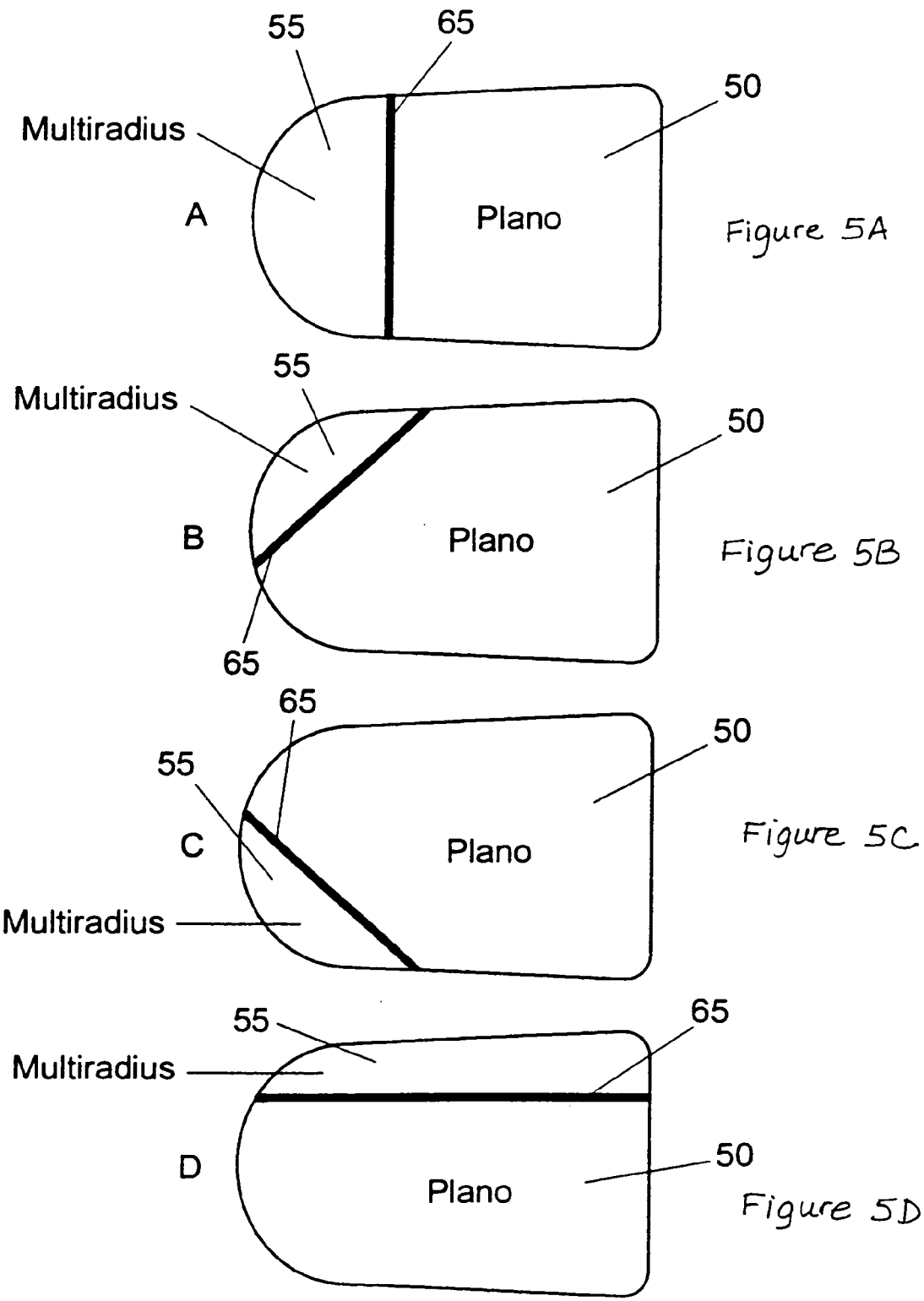
FIG. 5A–5H illustrate views of various locations for a plano reflective element and an auxiliary reflective element according to this present invention.
Figure 5E:
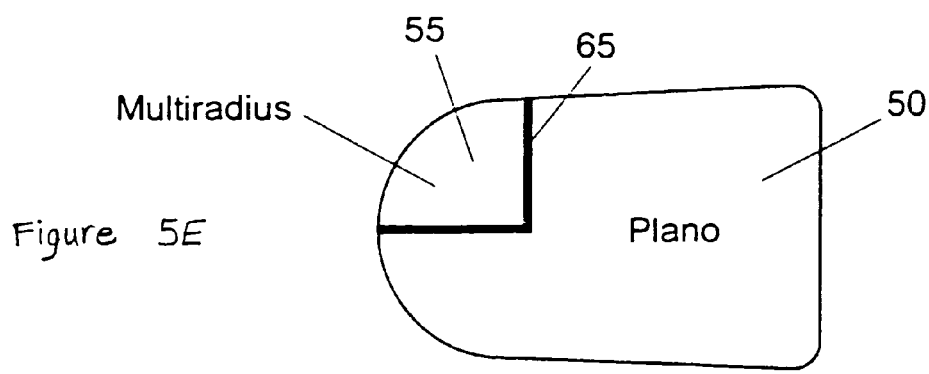
Figure 5F:
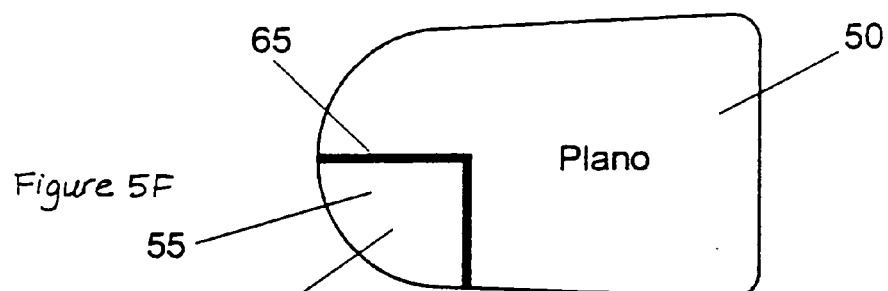
Figure 5G:
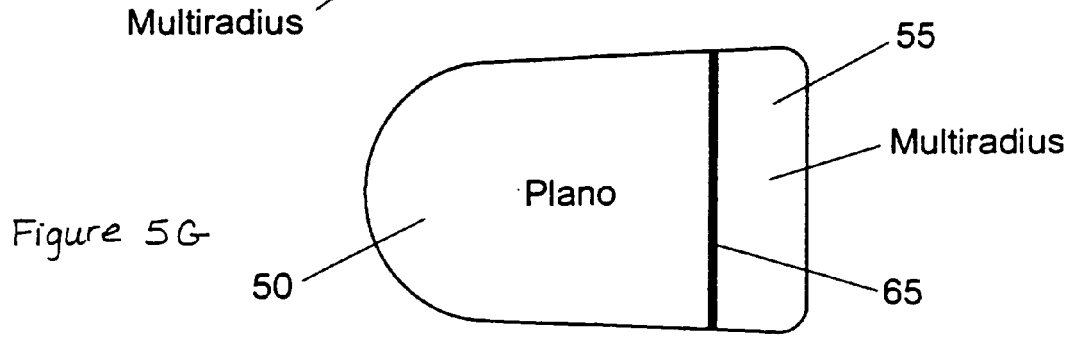
Figure 5H:
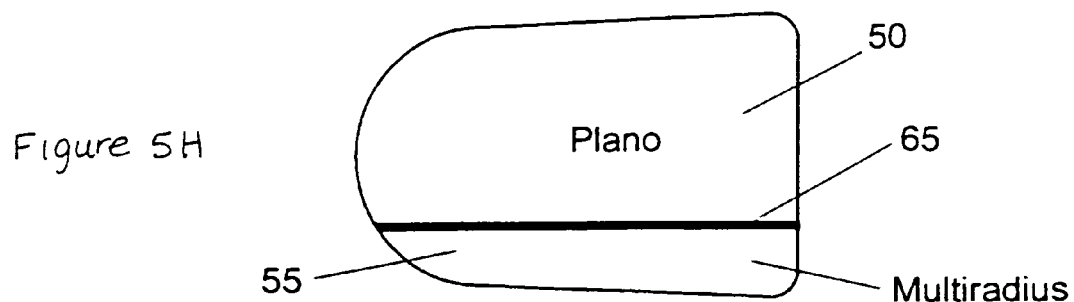

FIGS. 5A–5H shows various arrangements of multiradius reflective element 55 relative to its adjacent plano reflective element 50 (with demarcation element 65 disposed at their joint). In FIGS. 5A, 5B, 5C, 5E and 5F, plano element 50 is mounted wholly inboard of multiradius element 55. Thus, in FIGS. 5A, 5B, 5C, 5E and 5F, plano element 50 would be disposed closer to the vehicle body (and hence to the driver) than multiradius element 55 when plano-multiradius reflective element assembly 30 was mounted in an exterior sideview mirror attached to a side of an automobile. Therefore, in FIGS. 5A, 5B, 5C, 5E and 5F, plano element 50 would be mounted inboard relative to the side of the automobile and multiradius element 55 would be mounted outboard relative to the side of the automobile. In general, the location of the multiradius reflective element in the outboard, upper portion of the plano-multiradius reflective element assembly, as in FIGS. 5B and 5E, is preferred as this allows the plano portion provide a desired rearward field of view along the side of the vehicle. The configuration as shown in FIG. 5G (where the multiradius reflective element is along the inboard side of the assembly) is also desirable as this allows the driver view the side of the vehicle (something many drivers desire in order to have a frame of reference for their rearward field of view) while facilitating having a wide field of view for the plano portion.

Unlike trucks, busses and commercial vehicles the size of an exterior sideview mirror assembly suitable for use on an automobile (and especially when the automobile is not towing a trailer or the like) is restricted. Automobiles generally are non-commercial vehicles intended for personal transportation. Automobiles typically carry 5 passengers or less, although minivans and large sports utility vehicles (which are classified herein as automobiles) can have seat accommodation for up to 10 passengers (although accommodation for 7 passengers or less is more common). The tandem mounting of a plano element of unit magnification and a separate auxiliary element onto a common, single backing plate element, and the mounting of this backing plate element onto an actuator of an exterior sideview mirror assembly so that a driver can simultaneously and similarly move the auxiliary element and the plano element so as to position their respective rearward fields of view, and to achieve this within the relatively restricted space available in a standard automobile-sized exterior sideview mirror assembly is an important element of this present invention. By utilizing a plano element of unit magnification in the plano-multiradius reflective element assembly, and by sizing the reflector area of the plano element larger than the reflector area of the multiradius element and, preferably, by sizing the reflector area of the piano element at a sufficiently large size that the rearward field of view provided by the plano element alone meets and satisfies the minimum field of view requirement mandated by an automaker specification and/or a government regulation, the need to provide a safety warning indicia such as "OBJECTS IN MIRROR ARE CLOSER THAN THEY APPEAR" in the plano element and/or in the multiradius element can be obviated. Preferably, the plano element comprises a reflector surface area of a size sufficient, when mounted as part of a plano-multiradius reflective element assembly in a driver-side exterior sideview mirror assembly on an automobile, to provide the driver of the automobile a view of a level road surface extending to the horizon from a line, perpendicular to a longitudinal plane tangent to the driver's side of the automobile at the widest point, extending 8 feet out from the tangent plane 35 feet behind the driver's eyes (at a nominal location appropriate for any 95th percentile male driver or at the driver's eye reference points established in Federal Motor Vehicle Standard No. 104), with the driver seated in the driver's seat and with the driver's seat in the rearmost position. Also, preferably, the aspect ratio of the plano-multiradius reflective element assembly (defined as the ratio of its largest vertical dimension to its largest horizontal dimension, measured with the plano-multiradius reflective element assembly oriented as it would be oriented when mounted in an exterior sideview mirror assembly on an automobile, and with "horizontal" being generally parallel with the road surface the automobile travels on and "vertical" being generally perpendicular to the road surface the automobile travels on) is preferably less than 1, more preferably less than 0.8, most preferably less than 0.6. Further, it is preferable that the multiradius element be disposed outboard (relative to the side of the vehicle and with the plano-multiradius reflective element assembly oriented as it would be when mounted in an exterior sideview mirror assembly on an automobile) on the plano-multiradius reflective element assembly so that the multiradius element is positioned to provide an auxiliary, wide-angle view of a "blind-spot" region in an adjacent sidelane while the more inboard-disposed plano element with unit magnification provides the principal sideview image to the driver.

Also, it is preferable that the principal axis of the rearward field of view of the multiradius element be different from and angled to the principal axis of the rearward field of view of the plano element when both are attached to the backing plate element of the plano-multiradius reflective element assembly and when the plano-multiradius reflective element assembly is mounted and operated in an exterior sideview mirror assembly on an automobile. Preferably, the principal axis of the rearward field of view of the plano element is directed generally parallel to the road that the automobile equipped with the plano-multiradius reflective element assembly is travelling on (i.e. generally parallel to the longitudinal axis of the automobile) so as to provide the driver with a long-distance view of approaching vehicles in the side lane that the plano element views). However, preferably the principal axis of the rearward field of view of the multiradius element of, for example, a door-mounted driver-side (or passenger-side) exterior sideview mirror assembly in which the plano-multiradius reflective element assembly is mounted is directed generally downwardly towards the road surface adjacent to the driver seating location and/or several feet (such as about 1 foot to about 24 feet; more preferably, about 1 foot to about 12 feet; most preferably about 1 foot to about 8 feet in distance) to its rear (in order to capture a field of view of a rear approaching vehicle that is approaching to overtake, or is about to overtake, or is overtaking the automobile equipped with the plano-multiradius reflective element assembly). Thus, preferably, the principal axis of the rearward field of view of the multiradius element is angled and directed generally downwardly with respect to the longitudinal axis of the automobile and thus is at an angle to the principal axis of the rearward field of view of the plano element. For example, multiradius element 155 when attached to surface 173 of backing plate 160 (see FIG. 6B) would have its principal axis of rearward view as indicated by 180 as in FIG. 6B, and as such would be canted towards the road surface when mounted in an exterior sideview mirror assembly attached to the side of an automobile. By contrast, plano element 150 when attached to surface 174 of backing plate 160 (see FIG. 6A) would have a principal axis as indicated by 185 as in FIG. 6A and, as such, would be generally parallel to the road surface when mounted in an exterior sideview mirror assembly attached to the side of an automobile. Having the multiradius element canted somewhat downwards towards the road surface assists visual detection by the driver of overtaking vehicles in the traditional "blind-spot" in the adjacent side lane. The angle that the multiradius element is angled on the backing plate element of the plano-multiradius reflective element assembly relative to the plane of the plano reflective element will vary from automobile model to model, but generally is preferred to be in the about 1° to about 10° range; about 2° to about 8° range more preferred; and about 3° to about 6° range most preferred. In order to conveniently achieve an angling of the multiradius portion with respect to the plano portion (and preferably a downward angling), the portion of the backing plate element that the multiradius reflective element is attached to can be angled relative to the adjacent portion of the backing plate element that the plano reflective portion is attached to. Thus, and referring to FIG. 6, plano-multiradius reflective element assembly 130 includes a molded polymeric backing plate element 160 comprising a generally flat portion 162 (between BB and CC in FIG. 6) and an adjacent curved portion 161 (between AA and BB). As indicated by 190 and 195, portion AA to BB of backing plate element 160 is generally angled to portion BB to CC of backing plate 160. Preferably, the portion of backing plate element 160 to which the auxiliary reflective element attaches is angled towards the front (compared to the angling of plano reflective element) of an automobile equipped with the plano-auxiliary reflective element assembly of the present invention. FIG. 6 is a view of plano-multiradius reflective element assembly 130 as it would appear from above the vehicle as it would be orientated in use (with portion 162 closer to the driver than portion 161). The wall section, section XX in FIG. 6, taken through section 162 of backing plate element 160 is of substantially constant dimension (as illustrated in FIG. 6A) whereas the wall section, section YY in FIG. 6B, taken through section 161 of backing plate element 160 is of varying dimension and is angled. Plano reflective element 150 and multiradius reflective element 155 (for example, plano element 150 can comprise an electrochromic mirror element and multiradius element 155 can comprise a chrome coated glass reflector) are attached to portions 162 and 161, respectively. By being supported on the angled face 173 (see FIG. 6B) of portion 161, the principal viewing axis of multiradius reflector element 155 is angled downwards towards the road surface, as compared to the more horizontal-viewing principal viewing axis of plano element 150, when plano-multiradius reflective element 130 is mounted in an exterior sideview mirror assembly on an automobile. Demarcation element 165 is preferably molded in the same molding tool as is used to mold backing plate element 160, and so demarcation element 165 is formed as an integral part of backing plate element 160, forming a wall thereof that partitions the surface of backing plate element 160 into a region for receiving the plano reflective element 150 and a region for receiving the auxiliary reflective element 155. Also, end-caps 170 and 171 are optionally provided. Plano reflective element 150 can attach into the cavity formed between demarcation element 165 and end-cap 171; multiradius reflective element 155 can attach into the cavity formed between demarcation element 165 and end-cap 170. Note that the portion of the backing plate element where the wide-angle optic multiradius element attaches can have a thicker wall thickness than that of the portion of the backing plate element where the unit magnification optic element attaches in order to allow for the angling of the multiradius element downwardly relative to the angle of the plano element, as illustrated in FIGS. 6A–B. As illustrated in FIGS. 6A–B, the angle downwards to the longitudinal axis of the vehicle of the multiradius element can generally be set by an angling of a surface of the backing plate element in order to ensure that the principal axis of the rearward field of view of the plano element is directed generally parallel to the longitudinal axis of an automobile equipped with the plano-multiradius reflective element assembly and that the principal axis of the rearward field of view of the multiradius element is directed generally at an angle downwards to the longitudinal axis of the automobile.

Note that the provision of the plano-multiradius reflective element assembly of this invention as a unitary module has manufacturing advantages, particularly for exterior sideview mirror assembly manufacturers who can procure a plano-multiradius reflective element assembly module from a mirror reflector supplier and then mount the plano-multiradius reflective element assembly module onto an actuator.

Figure 7:
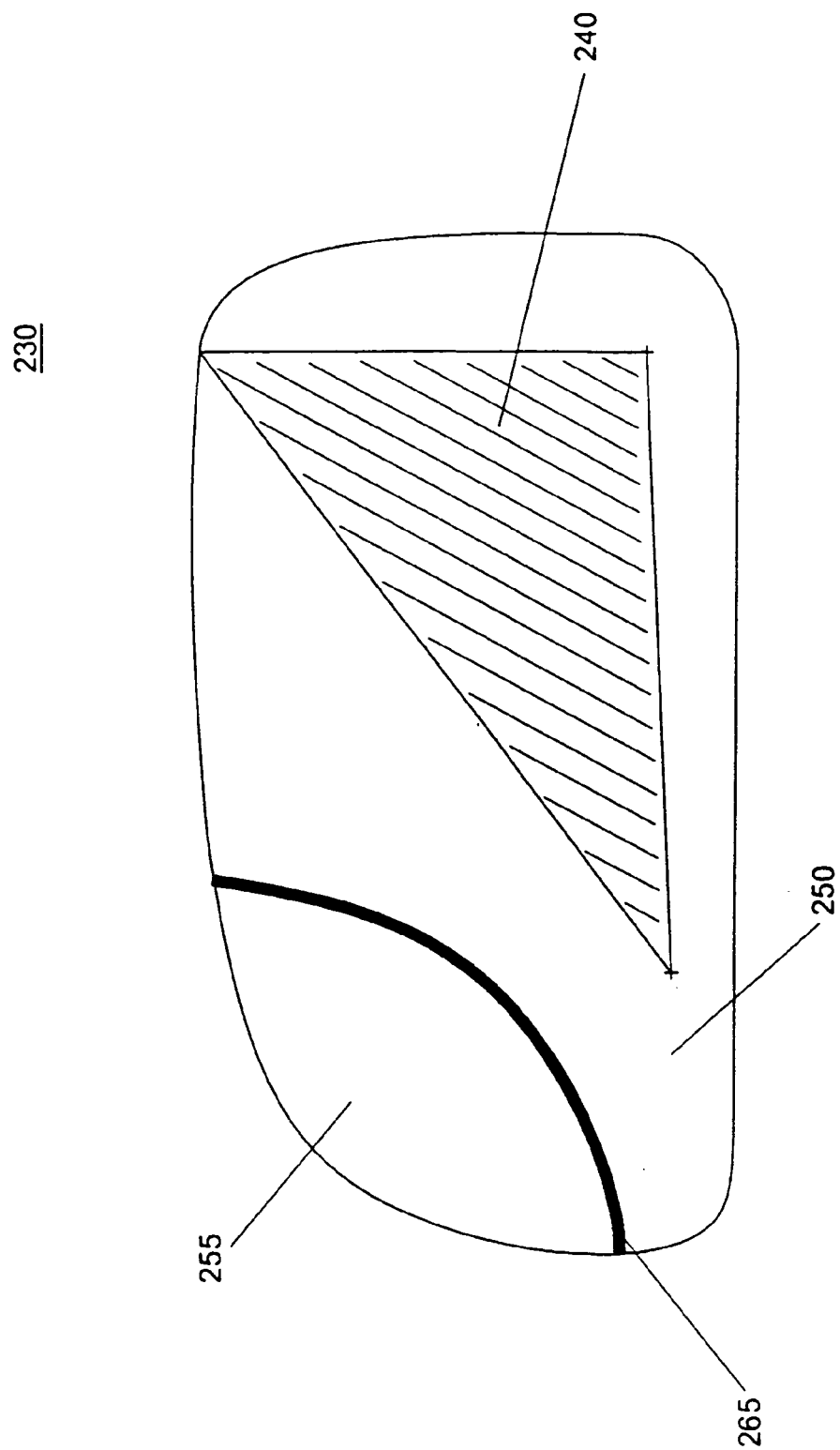
FIG. 7 is a schematic of a third embodiment of a plano-auxiliary reflective element assembly according to this present invention.

Referring to FIG. 7, a third embodiment 230 of a plano-multiradius reflective element assembly is illustrated. Plano-multiradius reflective element assembly 230 includes a plano reflective element 250 and a separate multiradius reflective element assembly 255, both individually attached to a backing plate element, and with demarcation element 265 disposed at their joint. Plano-multiradius reflective element assembly 230 is about 8.5 inches wide and about 4.25 inches tall (aspect ratio of 0.5), at their largest dimension. Shown as the shaded triangle 240 in plano reflective element 250 is the image of a triangular target object set about 35 feet rearward and of width about 8 feet and of height of about 4.1 feet as would be seen were plano-multiradius reflective element assembly 230 mounted in a driver-side exterior sideview mirror assembly in an automobile such as a sports utility vehicle. In general, it is desirable that the plano reflective element be dimensioned and configured so as to have its rearward field of view capture an image (that is visible, by reflection in the plano reflective element, to a driver seated in the driver's seat in an automobile to which is attached an exterior sideview mirror assembly equipped with the plano-auxiliary reflective element assembly according to this present invention) of a triangular shaped target located about 35 feet rearward of the driver seating location, extending about 8 feet out from the plane defined by the side of the automobile and reaching a height of between about 4 feet and about 5 feet from the road surface at that location 35 feet rearward of the automobile. The total field of view rearwardly of the vehicle of plano-multiradius reflective element assembly 230 (which is a combination of the field of view of plano reflective element 250 and of the auxiliary multiradius reflective element 255) preferably generally subtends an angle of at least about 30°(and more preferably, generally subtends an angle of at least about 35° and most preferably, generally subtends an angle of at least about 40°) with respect to the side of an automobile to which is attached an exterior sideview mirror assembly equipped with plano-multiradius reflective element assembly 230.

Figure 8:
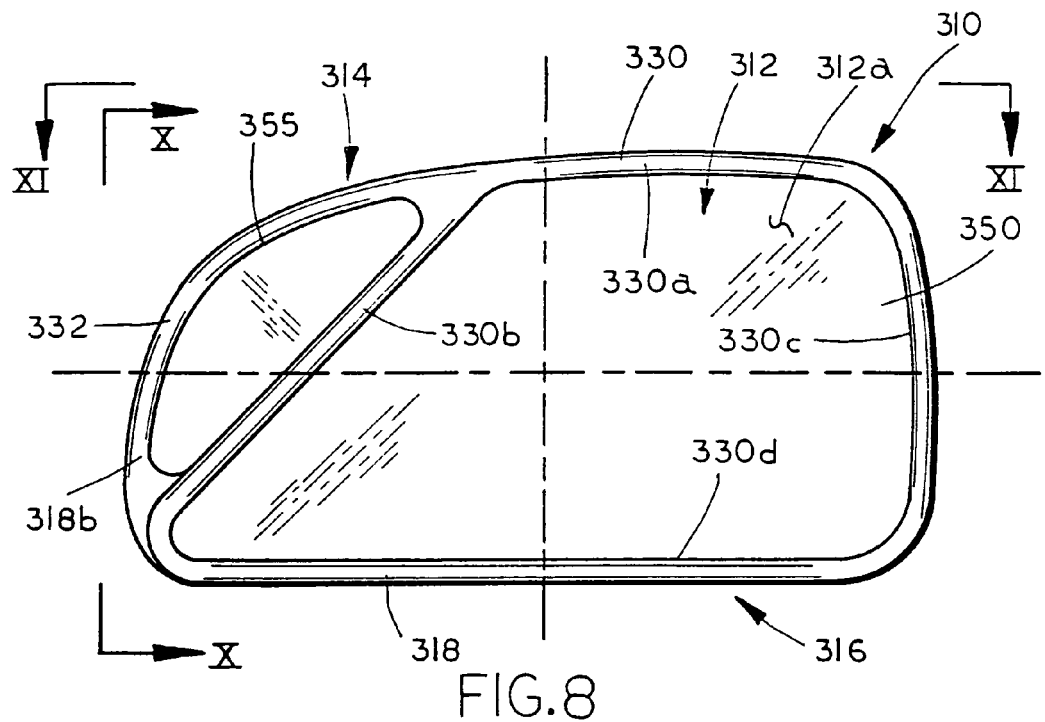
FIG. 8 is a front elevation view of another embodiment of a plano reflective element assembly according to the present invention.

Referring to FIG. 8, another embodiment 310 of the plano-auxiliary reflective element assembly of the present invention is illustrated. Plano-auxiliary reflective element assembly 310 includes a first reflective element 312 and a second or auxiliary, separate reflective element 314 which are together supported in a frame element assembly 316. As will be more fully described below, frame element assembly 316 is adapted such that when reflective elements 312 and 314 are placed, or otherwise positioned, in frame element assembly 316, the angular orientation of each reflective element is pre-established such that during assembly, the assembler need simply place the reflective elements in frame element assembly 316.

In the illustrated embodiment, frame element assembly 316 includes a frame 318 with a forward facing open portion 318a (FIG. 9) (and thus when frame element assembly 316 is mounted in a vehicle-mounted exterior sideview mirror assembly, the forward facing open portion (318a) is facing to the front of the vehicle) through which a reflective element subassembly 317a, which includes reflective element 312, is positioned in frame element assembly 316 and a rearward facing open portion 318b (FIG. 8) (which faces the rear of the vehicle when frame element assembly 316 is mounted in a vehicle mounted exterior sideview mirror assembly) in which a second reflective element subassembly 317b, which includes reflective element 314, is positioned in frame element assembly 316. Frame 318 preferably comprises a molded member formed from a plastic material, such as a reinforced nylon.

In preferred form, first reflective element 312 comprises a plano reflective element 350, such as a flat reflector coated glass substrate, with a reflective surface through which the angular height and width of an image of an object is equal to the angular height and width of the object when viewed to the same distance (except for flaws that do not exceed normal manufacturing tolerances) so as to have a unit magnification. Similar to the previous embodiment, plano reflective element 350 may comprise a conventional fixed reflectance reflective element or may comprise a variable reflectance reflective element who's reflectivity is electrically adjustable, as is known in the art. For example, plano reflective element 350 may comprise a flat glass substrate coated with metallic reflector coating, such as a chromium coating, titanium coating, rhodium coating, metal alloy coating, nickel alloy coating, silver coating, aluminum coating, or any alloy or composition of these metal reflectors. For further details of plano reflective element 350, reference is made to the previous embodiments.

In the illustrated embodiment, reflective element 312 comprises an electrochromic reflective element and includes a first substrate 312a and a second substrate 312b with an electrochromic medium 312c disposed between first and second substrates 312a, 312b. Such suitable electrochromic media include, for example, a solid polymer matrix electrochromic medium as noted in reference to the previous embodiments. Electrical connectors 320a and 320b are coupled to the electrochromic medium 312c to provide a potential across the electrochromic medium which induces the electrochromic medium to darken, as is known in the art. In the illustrated embodiment, reflective element subassembly 317a also includes an optional heater pad 322, which is disposed behind reflective element 312, and a vibration reducing element, such as a foam pad 326, positioned behind heater pad 322, which absorbs vibration of reflective element 312.

Referring again to FIG. 9, frame 318 is adapted to receive and support reflective element subassembly 317a, which is mounted to frame 318 by a backing plate 324, such as a plastic backing plate. In the illustrated embodiment, backing plate 324 mounts to the inner perimeter portion of frame 318 using conventional techniques, such as by adhesive bonding, heatstaking, snap-fit coupling, welding, or the like, to form part of frame element assembly 316. Alternatively, backing plate 324 may mount onto foam pad 326, for example, by an adhesive attachment, such as double sided sticky tape. In which case, reflective element 312 may be mounted to an inner surface of frame 318, such as by an adhesive attachment, including for example a silicone adhesive, with heater pad 322 mounted to reflective element 312, such as by an adhesive attachment, and foam pad 326 mounted to heater pad 322, such as by an adhesive attachment including, for example, double-sided sticky tape.

Figure 9:
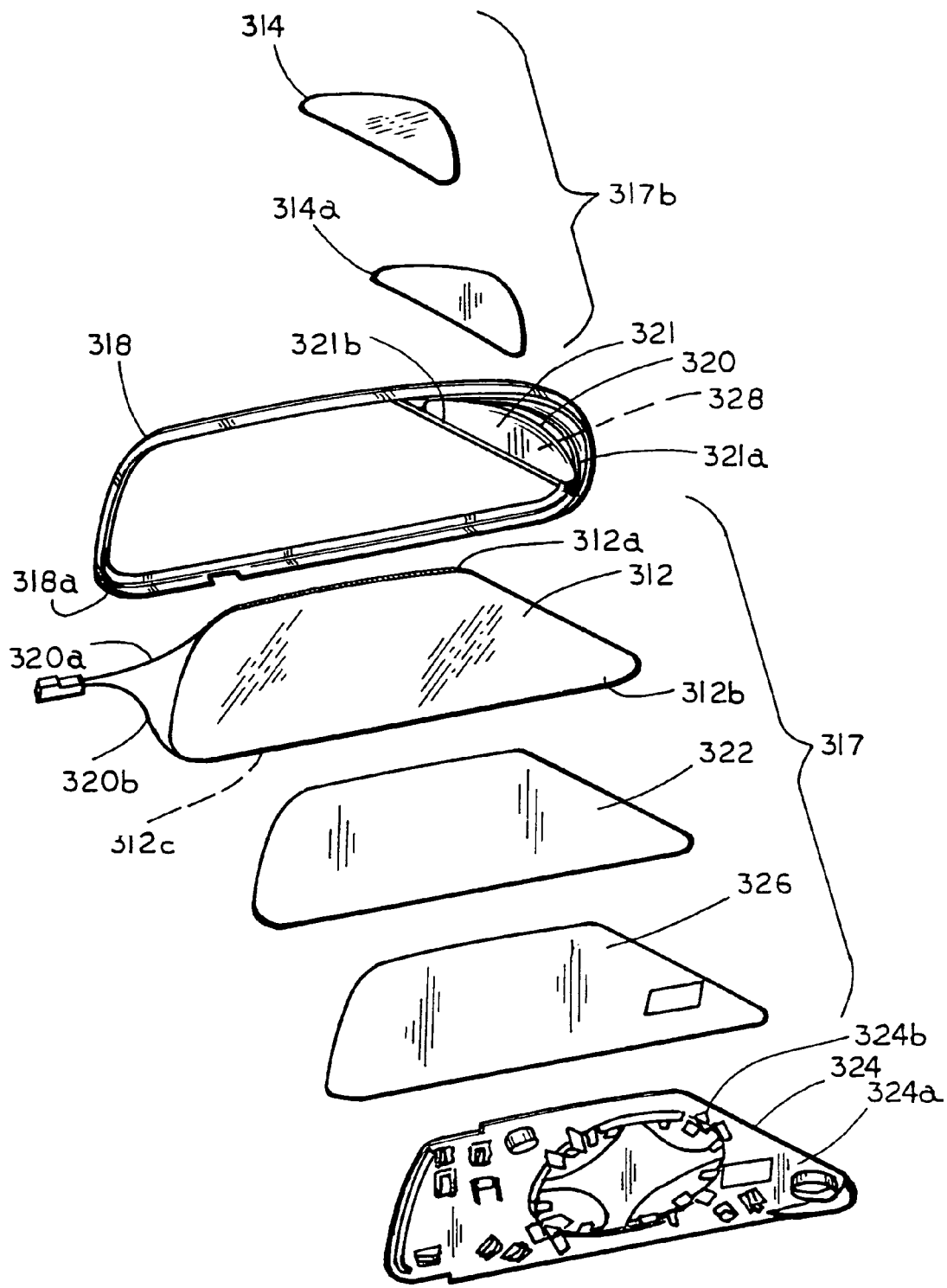
FIG. 9 is an exploded perspective view of the plano reflective element assembly of FIG. 8.
Figure 12:
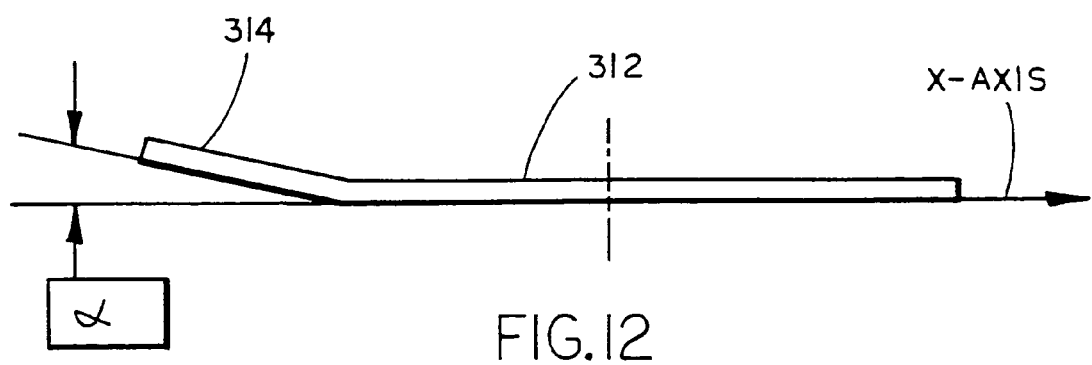
FIG. 12 is a schematic representation of the plano reflective element assembly of FIG. 8 illustrating the orientation of the reflective element.

Frame element assembly 316 mounts reflective element assembly 310 in the mirror casing and preferably on an actuator, such as an electric actuator, which permits adjustment to the orientation of reflective element assembly 310 about one or more axis. Examples of suitable actuators are described in U.S. Pat. Nos. 5,900,999; 5,986,364; 6,132,052; 6,037,689; and 6,094,027 and applications Ser. No. 09/277,632, filed Mar. 26, 1999, now U.S. Pat. No. 6,229,226, and Ser. No. 09/408,867, filed Sep. 29, 1999, now U.S. Pat. No. 6,243,218, which are incorporated herein by reference in their entireties. Optionally and preferably, backing plate 324 is adapted to engage or be engaged by the actuator for repositioning of plano-auxiliary reflective element assembly 310 about one or more axes. In this manner, the orientation of both reflective element 312 and reflective element 314 are simultaneously adjusted by the actuator. As best seen in FIG. 9, forward facing side 324a of backing plate 324 includes mounting structures 324b which are engaged by the actuator to thereby mount reflective element assembly 310 in the mirror casing.

Referring again to FIG. 8, frame 318 is a unitary frame and includes a first bezel portion 330 which extends around reflective element 312 and a second bezel portion 332 which extends around reflective element 314 to provide styling utility as well as functional utility. In this manner, a portion of forward facing side of frame 318 forms a support surface for reflective element 312, while a portion of rearward facing side of frame 318 forms first bezel portion 330. Similarly, another portion of the rearward facing side of frame provides support for reflective element 314 and also provides bezel portion 332. In addition, a portion of frame 318 forms a demarcation element at the juncture of reflective elements 312 and 314. In the illustrated embodiment, the demarcation element is formed by a section or portion of bezel portion 330, which will be described in greater detail in reference to bezel portion 330. Thus, frame element assembly 316 provides a support function, a positioning function, including an angling function, while also serving to provide styling utility and a demarcation function.

Second reflective element 314 comprises a radiused reflective element and, more preferably, a multiradiused reflective element 355 having a multiradiused curvature. For example, the radii of curvature of reflective element 314 may range from about 4000 mm to about 100 mm and, preferably, range from about 3000 mm to about 150 mm, and, most preferably, range from about 2000 mm to about 200 mm. In addition, reflective element 314 may comprise a fixed reflectance reflective element or may comprise a variable reflectance reflective element who's reflectivity is electrically adjustable. Preferably, reflective elements 312 and 314 include glass substrates, with at least the outer surface of each reflective element comprising glass. However, metalized plastic reflectors may also be used which is especially suitable for reflective element 314. In which case, the reflective element (314) would be especially suitable for molding in or along with frame 318, with the preformed metalized substrate forming reflective element 314 being placed into the mold forming frame 318. For further details of other suitable reflective elements, reference is made to the previous embodiments. In addition to reflective element 314, reflective element subassembly 317b includes a vibration reducing element, such as a foam pad 314a, which is positioned behind reflective element 314. Similar to reflective element 312, foam pad 314a is attached to reflective element 314 by an adhesive attachment, such as a double-sided sticky tape and, similarly, is attached to frame 318 as will be more fully described below.

As noted above, frame 318 includes a first bezel portion 330 and a second bezel portion 332. In addition, frame 318 includes an auxiliary support element 320 that provides a mounting surface or support surface for reflective element subassembly 317*b*. As best seen in FIGS. 9 and 10, support element 320 includes a recessed support surface 328 which is angled to provide an angled support surface for reflective element subassembly 317*b*. Thus, when reflective subassembly 317*b* is positioned on and mounted on support surface 328, such as by an adhesive attachment between foam pad 314*a* and support surface 328, the orientation of reflective element 314 is established by the angle of the support surface. Optionally, support element 320 includes gussets 321*a* and 321*b* which project forwardly from the forward facing side of frame 318 to thereby reinforce support surface 328.

Referring to FIG. 8, first bezel portion 330 includes an upper portion 330*a*, two side portions 330*b* and 330*c*, and a lower portion 330*d*. Side portion 330*b* forms an acute angle with respect to the lower portion 330*d* and an obtuse angle with respect to upper portion 330*a* and together with upper portion 330*a*, side portion 330*c*, and lower portion 330*d* form a perimeter around reflective element 312 to thereby form a styling feature. Second bezel portion 332 extends outwardly from upper portion 330*a* and downwardly to lower portion 330*d* of first perimeter portion 330 and together with side portion 330*b* forms a perimeter around second reflective element 314. Support element 320 extends behind and between side portion 330*b* and second bezel portion 332 so that reflective element 314 is recessed behind side portion 330*b* and bezel portion 332.

As best seen in FIG. 10, upper portion 330*a*, side portions 330*b* and 330*a*, and lower portion 330*d* are substantially coplanar and together define an outer surface below which reflective element 312 is recessed when reflective element 312 is mounted in frame 318. In contrast, perimeter portion 332 is angled forwardly with respect to the plane in which upper portion 330*a*, side portions 330*b* and 330*c*, and lower portion 330*d* lie. It should be understood that the terms "forwardly", "rearwardly" and "downwardly", are used in reference to when the mirror system is mounted in an automobile. Therefore, "forwardly" is a direction heading toward the front of the automobile, "rearwardly" is a direction heading to the rear of the automobile, "outwardly" is a direction away from the side of the vehicle on which the mirror assembly is mounted, and "downwardly" is a direction heading toward the surface on which the vehicle is positioned (such as a ground or road surface). Similarly as noted above, reflective element 314 is recessed below an outer surface of perimeter portion 332 and also below the outer surface of side portion 330*b* when mounted in frame 318.

As would be understood from FIGS. 9–11, support surface 328 is also angled forwardly with respect to back plate 324 and/or reflective element 312 when frame element assembly 316 is mounted in an automobile mounted exterior sideview mirror system. In addition, support surface 328 is also angled or tilted downwardly with respect to reflective element 312 and/or backing plate 324 such that when reflective element 314 is supported on support surface 328, reflective element 314 provides an increased field of view extending laterally or outwardly from the longitudinal axis of the automobile and also downwardly of the longitudinal axis of the automobile.

Figure 13:
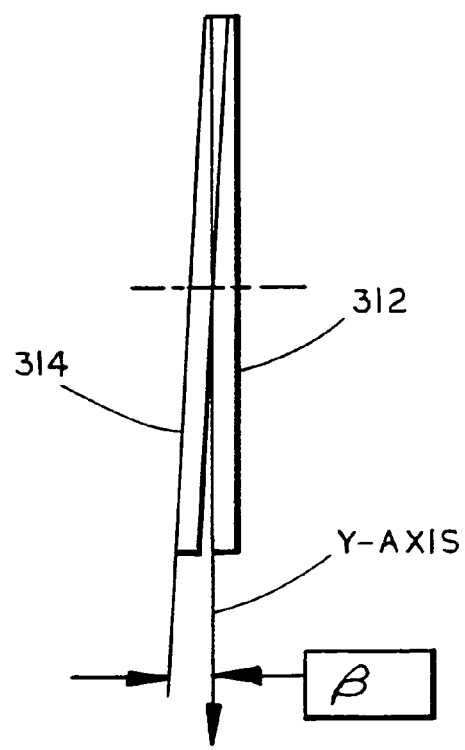
FIG. 13 is another schematic representation of the orientation of the reflective elements of the plano reflective element in FIG. 8.
Figure 14:
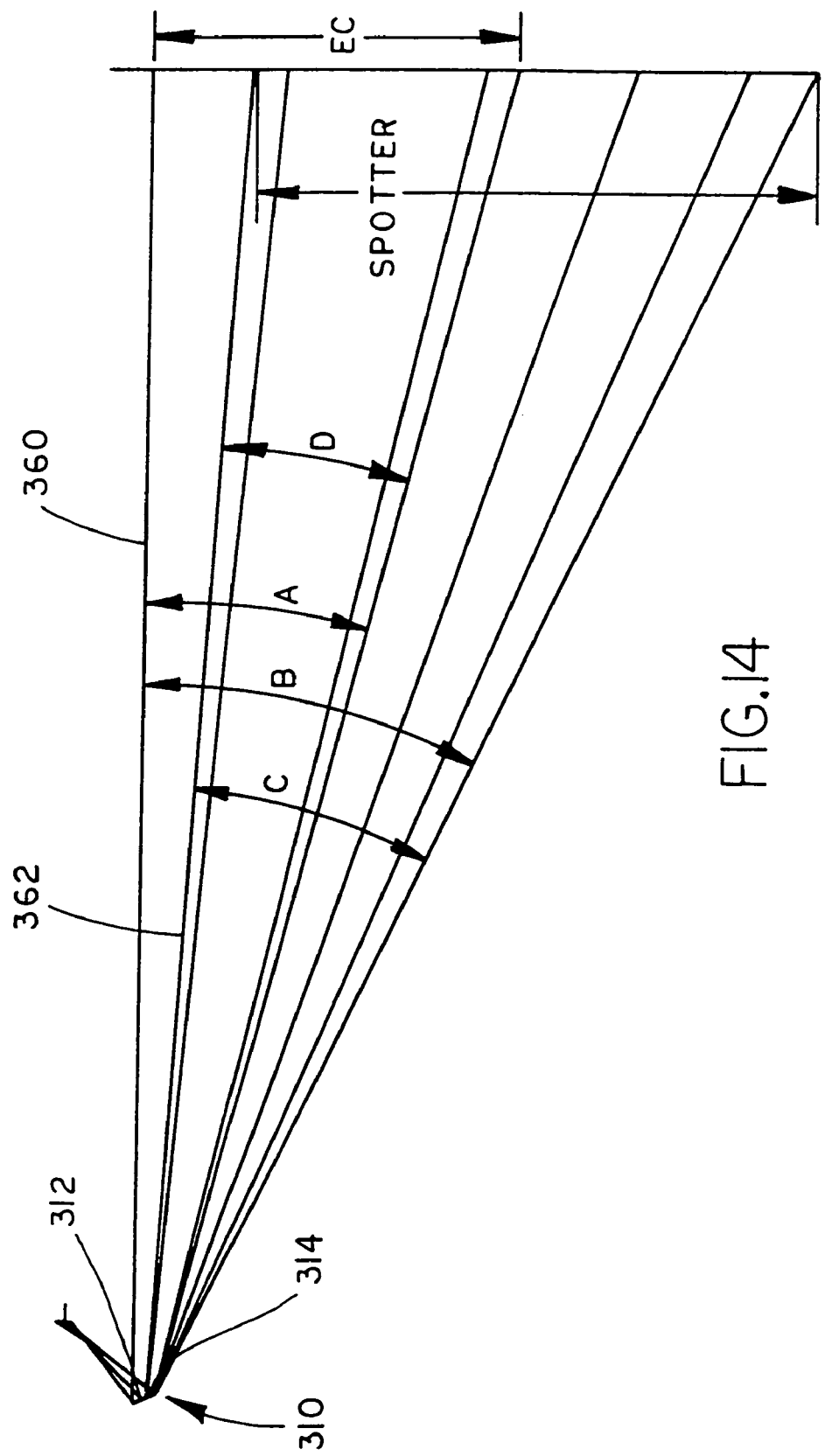
FIG. 14 is a diagram illustrating the range of viewing of the reflective elements of the plano reflective element assembly of FIG. 8.

Referring to FIGS. 13 and 14, support surface 328 is configured such that reflective element 314 is tilted forwardly at an angle α with respect to the X-axis of reflective element 312. In one form, angle α is in a range of about 0.75° to about 5°. In another form, angle α is in a range of about 1° to about 3°. In yet another form, angle α is in a range of about 1.25° to about 2.5°. Reflective element 314 is also tilted downwardly with respect to the Y-axis of reflective element 312 at an angle β. In one form, angle β is in a range of about 0.75° to about 5°. In another form, angle β is in a range of about 1.5° to about 3.5°. In yet another form, angle β is in a range of about 2° to about 3°. With the tilted orientation of reflective element 314, reflective element 314 provides a field of view with a principal axis that sweeps outwardly and downwardly with respect to the principal axis of the field of view of reflective element 312.

In the illustrated embodiment, support surface 328 is provided by a plate member 321. Plate member 321 may comprise a solid plate member or a foraminous plate member. In the illustrated embodiment, plate member 321 is integrally formed with perimeter portions 330 and 332 during the molding process of frame 318. As previously noted, frame 318 includes a rearwardly facing opening 318*b* through which reflective element 314 is inserted for placement on support surface 328. For example, reflective element 314 may be positioned in frame 318 on support surface 328 during the molding process of frame 318, such as by insert molding, or may be inserted into frame 318 before the plastic material forming frame 318 is fully cured and is still pliable. In which case, reflective element subassembly 317*b* is mounted to auxiliary support 320 by an adhesive attachment or a mechanical attachment. Alternatively, support surface 328 may be formed by peripheral flange or a frame. In this manner, reflective element subassembly 317*b* may be placed in frame 318 from its forward facing side.

Referring to FIG. 14, when reflective element assembly 310 is mounted in a vehicle reflective element 312 has a field of view 360 which forms an angle A with respect to the longitudinal center line of the vehicle in a range of about 8° to about 20°. In another form, angle A is in a range of about 10° to about 18°. In yet another form, angle A is in a range of about 12° to about 16°. Similarly, reflective element 314 has a field of view 362 which forms an angle C in range of about 15° to about 50°. In another form, angle C is in a range of about 15° to about 35°. In yet another form, angle C is in a range of about 15° to about 25°. Consequently, the overall field of view of reflective elements 312 and 314 extends over an angle B, which ranges from about 8° to about 50° in one form, about 10° to about 35° in another form, and about 12° to about 25° in yet another form. Furthermore, field of views 360 and 362 overlap over a range having angle D in a range of about 20° to about 2°, or in a range of about 15° to about 5°. In another form, angle D is in a range of about 10° to about 8°.

From the foregoing, it can be appreciated that reflective elements 312 and 314 provide a wider field of view than a wholly planar rearview mirror element that fully accommodates an equivalent frame having similar dimensions. In addition, because reflective elements 312 and 314 have overlapping field of views, an image in the field of view of reflective element 314 will transition or move between the reflective elements and appear in both reflective elements during the transition to thereby enable the driver of the automobile to view or be conscious of the object continuously. In the illustrated embodiment, reflective element 314 is positioned in an outboard position relative to reflective element 312; therefore, when a vehicle or object that is approaching the automobile from the rear and to some extent from the side, the image of the approaching object will first appear in reflective element 312, then appear in both reflective elements 314 and 312, and then move to reflective element 314 so that the driver will be initially aware of the approaching object when its image first appears in reflective element 312 and continue to be aware of the object as it moves closer to the automobile, thus increasing the range of viewing of the driver. Since the image transitions smoothly from reflective element 312 to reflective element 314, the driver's awareness of the object is continuous and, further, the driver is not distracted from sudden transitions that often occur with conventional spotter mirrors. Typically, when an object "falls" or "drops" out, a driver's consciousness of the object reduces significantly, if not ceases, which is one of the causes of many automobile blind spot accidents. Hence, when combined with the field of view of an interior rearview mirror system, the present invention reduces, if not eliminates, an automobile's blind spot. For further discussion of blind spots in vehicle rearview mirror systems, reference is made to copending U.S. provisional application entitled VEHICULAR REARVIEW MIRROR SYSTEM, Ser. No. 60/252,149, filed Nov. 20, 2000 by Robert E. Schnell, David K. Willmore, and Richard J. Weber which is herein incorporated by reference in its entirety. Thus, the plano-auxiliary reflective element assembly provides a seamless rearvision function whereby the image of a side approaching/side overtaking other vehicle is substantially seamlessly maintained as the image of the overtaking or approaching vehicle transitions from being principally and substantially viewed by the driver of the vehicle (the vehicle mounted with the mirror system of the present invention) in the plano reflective element to be seen in the auxiliary reflective element.

Figure 15:
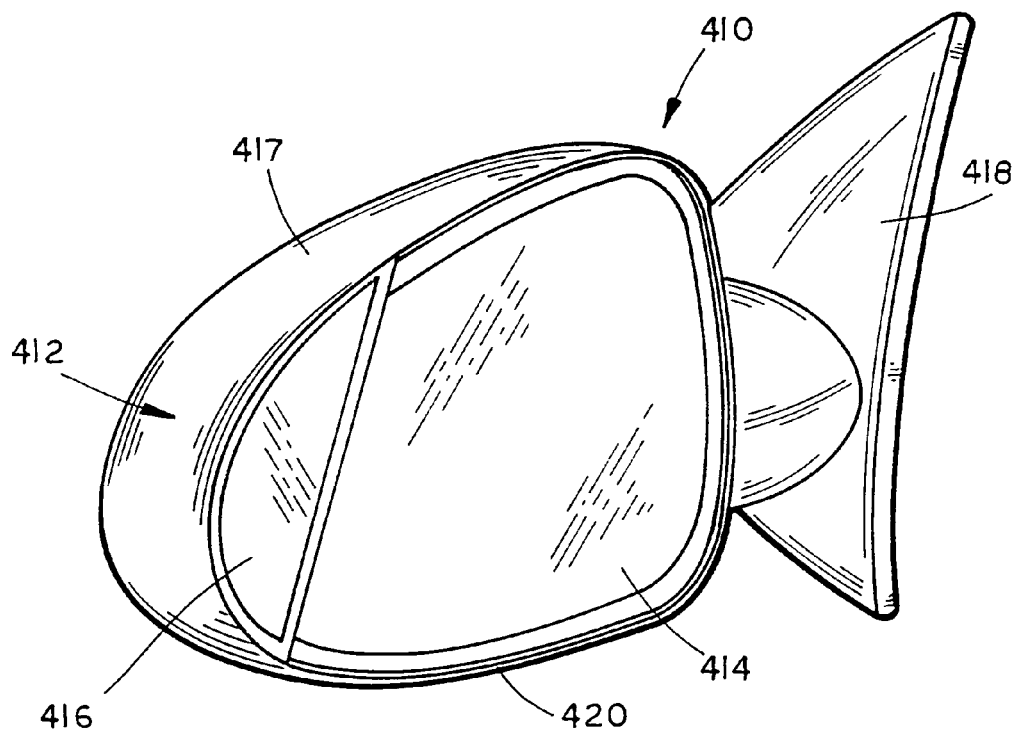
FIG. 15 is a perspective view of another embodiment of an exterior rearview mirror system of the present invention.

Referring to FIG. 15, the numeral 410 generally designates yet another embodiment of an automobile exterior sideview mirror system of the present invention. Exterior sideview mirror system 410 includes a housing 412, a first reflective element 414, and a second or auxiliary, separate reflective element 416, which together provide an increase field of view over conventional planar reflectors mounted in a frame of equivalent dimensions to the combined lateral dimensions of reflective element 414 and 416.

Housing 412 includes a mirror casing 417 and a sail 418, which mounts casing 412 to a side of an automobile. Though illustrated as a fixed mounting arrangement, it should be understood that mirror system 410, like the previous embodiments, may comprise a break-away mirror system or a powerfold mirror system.

In the illustrated embodiment, reflective element 414 comprises a plano reflective element having a unit magnification, similar to the plano reflective elements described in reference to the previous embodiments. Reflective element 416 preferably comprises a wide-angle reflector, such as a convex or aspheric reflector, and may include a multiradiused curvature. For further description of suitable reflectors, reference is made to the previous embodiment.

In the illustrated embodiment, reflective element 416 is mounted in an outboard position relative to reflective element 414 and is fixedly mounted to bezel 420 of mirror casing 417. In addition, reflective element 416 is preferably angled downwardly and forwardly relative to first reflective element 414 when mirror system 410 is mounted to an automobile to thereby increase the field of view of mirror system 410. Optionally and preferably, reflective element 416 is detachably mounted to bezel 420, such as by mechanical fasteners, including clips, so that reflective element 416 can be removed, such as for replacement.

Reflective element 414 preferably comprises an independently positionable reflective element and is mounted by a backing member, such as a backing plate, to an actuator, which provides multi-axis positioning of reflective element 414. In this manner, reflective element 414 and reflective element 416 are separately and independently mounted in housing 412. In addition, reflective element 414 optionally extends behind reflective element 416 in order to maintain the overlap of the field of views of reflective elements 414 and 416 even when reflective element 414 is moved by the actuator. Similar to the previous embodiment, when an object moves toward the automobile, in which mirror system 410 is mounted, from the rear of the automobile or laterally with respect to the automobile, the image of the object will appear initially in reflective element 414. As the object moves closer to the automobile, the image of the object will move from reflective element 414 to reflective element 416 such that when the image transitions between reflective element 414 and reflective element 416, the image will appear in both reflective elements.

Also, although it is preferable to utilize a multiradius or compound curvature reflective element, such as an aspherical element or a compound curvature element, for the second or auxiliary mirror element adjacent the plano or first reflective element (as this enables least discontinuity in image at the joint between the adjacent elements of the assembly), a spherical reflective element (that has substantially only one radius of curvature and, as such, is a section from a sphere) can optionally be used adjacent the plano reflective element instead of, or in addition to, the multiradius reflective element. Also, a plano auxiliary mirror such as a flat mirrored substrate can be used, less preferably, as a substitute for a multiradius reflective element in those embodiments where the auxiliary reflective element is angled relative to the plane of the principal, plano reflective element so as to view a blind spot region of the principal plano element. Also, the plano-multiradius reflective element assembly can optionally be fixedly attached to an exterior sideview mirror assembly housing that is not movable, or, alternately, the exterior sideview mirror assembly housing to which the plano-multiradius reflective element assembly is fixedly attached can itself be actuated to move, such as by motor action, so that by moving the exterior sideview mirror assembly housing, the field of rearward view of the plano-multiradius reflective element assembly fixedly attached thereto can correspondingly move and be repositioned to suit the field of view need of a particular driver seated in the automobile cabin.

The above description is considered that of the preferred embodiments only. Modification of the invention will occur to those skilled in the art and to those who make or use the invention. Therefore, it is understood that the embodiments shown in the drawings and described above are merely for illustrative purposes and are not intended to limit the scope of the invention, which is defined in the following claims as interpreted according to the principles of patent law, including the doctrine of equivalents.

We claim:

1. An automobile exterior sideview mirror system comprising:

an exterior sideview mirror assembly adapted for attachment to a side of an automobile;

said exterior sideview mirror assembly including a reflective element assembly;

said reflective element assembly including a first reflective element having unit magnification and a second reflective element having a curvature;

said first reflective element and said second reflective element supported at a support element and with a demarcation element between said first and second reflective elements, said first and second reflective elements abutting opposing sides of said demarcation element;

said second reflective element disposed at an outboard, upper portion of said reflective element assembly when said reflective element assembly is included in said exterior sideview mirror assembly and when said exterior sideview mirror assembly is attached to the side of an automobile;

said second reflective element supported on said support element adjacent to and separate from said first reflective element; and wherein substantially the entire portion of said second reflective element that abuts said demarcation element has its front surface generally coplanar with the front surface of said first reflective element whereby an image in the field of view of said second reflective element transitions to the field of view of said first reflective element smoothly.

2. The exterior sideview mirror system of claim 1, wherein said demarcation element is dark colored.

3. The exterior sideview mirror system of claim 1, wherein said reflective element assembly includes a first bezel portion extending around said first reflective element, said demarcation element comprising a segment of said first bezel portion.

4. The exterior sideview mirror system of claim 1, wherein said second reflective element comprises a curved reflective element comprising a bent substrate with at least one radius of curvature in the range of about 4000 mm to about 100 mm.

5. The exterior sideview mirror system of claim 1, wherein said support element comprises a frame, said first and second reflective elements being mounted at said frame.

6. The exterior sideview mirror system of claim 5, wherein said second reflective element is mounted at said frame at an outboard position, and said first reflective element is positioned adjacent said second reflective element and at an inboard position with respect to said second reflective element when said exterior sideview mirror assembly is mounted to an automobile.

7. The exterior sideview mirror system of claim 5, wherein said first reflective element is mounted at said frame by a backing plate.

8. The exterior sideview mirror system of claim 7, wherein said backing plate is adapted to mount to an actuator operable to adjust the orientation of said reflective element assembly.

9. The exterior sideview mirror system of claim 8, wherein said actuator comprises an electrical actuator.

10. The exterior sideview mirror system of claim 7, wherein said backing plate is attached to one side of said first reflective element and said frame by one of an adhesive attachment, a welded attachment, and a mechanical attachment.

11. The exterior sideview mirror system of claim 10, wherein an opposed side of said frame forms a bezel around said first reflective element.

12. The exterior sideview mirror system of claim 5, wherein said first reflective element and said second reflective element are adjacently attached at said frame, said frame including a first perimeter portion and a second perimeter portion, said first perimeter portion extending around said first reflective element, and said second perimeter portion extending around said second reflective element.

13. The exterior sideview mirror system of claim 12, wherein a side portion of said first perimeter portion of said frame provides said demarcation element between said first reflective element and said second reflective element.

14. The exterior sideview mirror system of claim 12, wherein said second perimeter portion is angled downwardly and forwardly with respect to said first perimeter portion when said mirror assembly is mounted to an automobile.

15. The exterior sideview mirror system of claim 5, wherein said second reflective element is attached at said frame by at least one of an adhesive attachment and a mechanical attachment.

16. The exterior sideview mirror system of claim 1, wherein said first reflective element includes a rearward field of view having a principal axis different from a principal axis of the rearward field of view of said second reflective element when mounted in said exterior sideview mirror assembly.

17. The exterior sideview mirror system of claim 16, wherein said principal axis of the rearward field of view of said second reflective element is directed generally outwardly and downwardly with respect to the principal axis of the first reflective element.

18. The exterior sideview mirror system of claim 17, wherein said principal axis of the rearward field of said second reflective element forms a downward angle with respect to the longitudinal axis of the automobile in the range from about 0.75° to about 5° when the principal axis of the first reflective element is generally parallel to the longitudinal axis of the automobile.

19. The exterior sideview mirror system of claim 18, wherein said downward angle is in a range from about 1.5° to about 3.5°.

20. The exterior sideview mirror system of claim 18, wherein said downward angle is in a range of about 2° to about 3°.

21. The exterior sideview mirror system of claim 17, wherein said principal axis of said second reflective element forms an outward angle with respect to the longitudinal axis of the automobile in a range of about 0.75° to about 5°.

22. The exterior sideview mirror system of claim 21, wherein said outward angle is in a range of about 1° to about 3°.

23. The exterior sideview mirror system of claim 22, wherein said outward angle is in a range of about 1.25° to about 2.5°.

24. The exterior sideview mirror system of claim 22, wherein said exterior sideview mirror assembly comprises a fixedly attached exterior sideview mirror assembly.

25. The exterior sideview mirror system of claim 1, wherein said exterior sideview mirror assembly comprises a break-away exterior sideview mirror assembly.

26. The exterior sideview mirror system of claim 1, wherein said exterior sideview mirror assembly comprises a powerfold exterior sideview mirror assembly.

27. The exterior sideview mirror system of claim 1, wherein at least one of said first reflective element and said second reflective element comprises a variable reflectance reflective element.

28. The exterior sideview mirror system of claim 27, wherein each of said first reflective element and said second reflective element comprises a variable reflectance reflective element.

29. The exterior sideview mirror system of claim 1, wherein said first reflective element comprises an electrochromic reflective element.

30. The exterior sideview mirror system of claim 1, wherein said first reflective element has a first principal axis and said second reflective element has a second principal axis when supported on said support element, said second principal axis being angled outwardly from said first principal axis at an angle in a range of about 0.75° to about 5°.

31. The exterior sideview mirror system of claim 30, wherein said second principal axis is angled outwardly from said first principal axis at an angle in a range of about 1° to about 3°.

32. The exterior sideview mirror system of claim 30, wherein said second principal axis is angled outwardly from said first principal axis at an angle in a range of about 1.25° to about 2.5°.

33. The exterior sideview mirror system of claim 1, wherein said second reflective element has a second principal axis that is angled downwardly from a first principal axis of said first reflective element when supported on said support element.

34. The exterior sideview mirror system of claim 33, wherein said second principal axis is angled downwardly from said first principal axis at an angle in a range of approximately 0.75° to about 5°.

35. The exterior sideview mirror system of claim 33, wherein said second principal axis is angled downwardly from said first principal axis at an angle in a range of about 2° to about 3°.

36. The exterior sideview mirror system of claim 1, wherein said second reflective element has a second principal axis that is directed generally outwardly and downwardly with respect to a longitudinal axis of an automobile when said mirror assembly is mounted to the automobile and when the principal axis of the first reflective element is generally parallel to the longitudinal axis of the vehicle.

37. The exterior sideview mirror system of claim 1, wherein said support element includes a support surface for said second reflective element, said support surface angling a second principal axis of said second reflective element.

38. An automobile exterior sideview mirror system comprising:
an exterior sideview mirror assembly adapted for attachment to a side of an automobile;
said exterior sideview mirror assembly including a reflective element assembly;
said reflective element assembly including a first reflective element having unit magnification and a second reflective element having a curvature;
said second reflective element disposed at an outer, upper portion of said reflective element assembly when said reflective element assembly is included in said exterior sideview mirror assembly and when said exterior sideview mirror assembly is attached to the side of an automobile;
said second reflective element disposed adjacent to and separate from said first reflective element;
said first reflective element including a rearward field of view having a principal axis, said second reflective element having a rearward field of view having a principal axis, said principal axis of said second reflective element angled downwardly with respect to the principal axis of said first reflective element when mounted in said exterior sideview mirror assembly;
a demarcation element between said first reflective element and said second reflective element, said first and second reflective elements abutting opposing sides of said demarcation element; and
wherein substantially the entire portion of said second reflective element abutting said demarcation element has its front surface generally coplanar with the front surface of said first reflective element whereby an image in the field of view of said second reflective element transitions to the field of view of said first reflective element smoothly.

39. The exterior sideview mirror system of claim 38, wherein said reflective element assembly includes a first bezel portion extending around said first reflective element, said demarcation element comprising a segment of said first bezel portion.

40. The exterior sideview mirror system of claim 38, wherein said second reflective element comprises a curved reflective element comprising a bent substrate with at least one radius of curvature in the range of about 4000 mm to about 100 mm.

41. The exterior sideview mirror system of claim 38, further comprising a support element, said first reflective element and said second reflective element supported at said support element.

42. The exterior sideview mirror system of claim 41, wherein said support element including a support surface for said second reflective element, said support surface angling said principal axis of said second reflective element.

43. The exterior sideview mirror system of claim 42, wherein said principal axis of said second reflective element is directed generally outwardly and downwardly with respect to the principal axis of the first reflective element when said mirror assembly is mounted to the automobile.

44. The exterior sideview mirror system of claim 38, further comprising an actuator operable to adjust the orientation of said reflective element assembly.

45. The exterior sideview mirror system of claim 38, wherein said principal axis of the rearward field of view of said second reflective element is directed generally outwardly and downwardly with respect to the principal axis of the first reflective element.

46. The exterior sideview mirror system of claim 38, wherein said principal axis of said second reflective element forms an outward angle with respect to a longitudinal axis of the automobile.

47. The exterior sideview mirror system of claim 38, further comprising a frame, said first and second reflective elements being mounted at said frame, said frame including a first perimeter portion and a second perimeter portion, said first perimeter portion extending around said first reflective element, and said second perimeter portion extending around said second reflective element.

48. The exterior sideview mirror system of claim 47, wherein a side portion of said first perimeter portion of said frame provides said demarcation element between said first reflective element and said second reflective element.

49. An automobile exterior sideview mirror system comprising:
an exterior sideview mirror assembly adapted for attachment to a side of an automobile;
said exterior sideview mirror assembly including a reflective element assembly;
said reflective element assembly including a first reflective element having unit magnification and a second reflective element having a curvature;
an actuator operable to adjust the orientation of said reflective element assembly;
said first reflective element extending from an inboard side of said reflective element assembly to an outboard side of said reflective element assembly;
said second reflective element disposed at an outboard, upper portion of said reflective element assembly wherein at least a portion of said first reflective element is disposed beneath said second reflective element at an outboard lower portion of said element assembly when said reflective element assembly is included in said exterior sideview mirror assembly and when said exterior sideview mirror assembly is attached to the side of an automobile;

said second reflective element disposed adjacent to and separate from said first reflective element;

a demarcation element between said first reflective element and said second reflective element, said first and second reflective elements abutting opposing sides of said demarcation element; and wherein substantially the entire portion of said second reflective element abutting said demarcation element has its front surface generally coplanar with the front surface of said first reflective element whereby an image in the field of view of said second reflective element transitions to the field of view of the first reflective element smoothly.

50. The exterior sideview mirror system of claim 49, wherein said first reflective element has a first principal axis and said second reflective element has a second principal axis, said second principal axis being angled outwardly from said first principal axis.

51. The exterior sideview mirror system of claim 50, wherein said second principal axis is angled downwardly from said first principal axis of said first reflective element.

52. The exterior sideview mirror system of claim 51, wherein said second principal axis is directed generally outwardly and downwardly with respect to a longitudinal axis of an automobile when said mirror assembly is mounted to the automobile.

53. The exterior sideview mirror system of claim 51, further comprising a support element, said support element including a support surface for said second reflective element, said support surface tilting said second reflective element to angle said second principal axis of said second reflective element relative to said first principal axis.

54. The exterior sideview mirror system of claim 53, wherein said support element comprises a frame, said first and second reflective elements being mounted at said frame.

55. The exterior sideview mirror system of claim 54, wherein said second reflective element is mounted at said frame at an outboard position, and said first reflective element is positioned adjacent said second reflective element and at an inboard position with respect to said second reflective element when said exterior sideview mirror assembly is mounted to an automobile.

56. The exterior sideview mirror system of claim 55, wherein said frame includes a first perimeter portion and a second perimeter portion, said first perimeter portion extending around said first reflective element, and said second perimeter portion extending around said second reflective element.

57. The exterior sideview mirror system of claim 56, wherein a side portion of said first perimeter portion of said frame provides said demarcation element between said first reflective element and said second reflective element.

58. The exterior sideview mirror system of claim 57, wherein said second perimeter portion is angled downwardly and forwardly with respect to said first perimeter portion when said mirror assembly is mounted to an automobile.

* * * * *

UNITED STATES PATENT AND TRADEMARK OFFICE
CERTIFICATE OF CORRECTION

PATENT NO. : 7,167,294 B2  Page 1 of 1
APPLICATION NO. : 10/817645
DATED : January 23, 2007
INVENTOR(S) : Niall R. Lynam, John O. Lindahl and Hahns Y. Fuchs It is certified that error appears in the above-identified patent and that said Letters Patent is hereby corrected as shown below:

Column 1:
Line 13, "entirety" should be --entireties--.

Column 6:
Line 46, "ajoint." should be --a joint.--.

Column 8:
Line 34, "piano" should be --plano--.

Column 9:
Line 61, "piano" should be --plano--.

Column 10:
Line 56, "piano" should be --plano--.

Column 11:
Line 22, "piano" should be --plano--.

Column 13:
Line 45, "piano" should be --plano--.

Column 27:
Claim 49, Line 2, insert --reflective-- after "said".

Signed and Sealed this

Twenty-fourth Day of June, 2008

JON W. DUDAS
*Director of the United States Patent and Trademark Office*